US011850914B2

(12) United States Patent
Polyzois et al.

(10) Patent No.: US 11,850,914 B2
(45) Date of Patent: Dec. 26, 2023

(54) METHODS AND SYSTEMS OF CONVEYING DATA TO AND FROM A TRANSPORT CLIMATE CONTROL SYSTEM

(71) Applicant: THERMO KING CORPORATION, Minneapolis, MN (US)

(72) Inventors: Christos Alkiviadis Polyzois, Bloomington, MN (US); Wendy K. Foslien, Woodbury, MN (US); Hardeep Singh, Minneapolis, MN (US); Grant Ovsak, Hopkins, MN (US); Matthew Srnec, Minnetonka, MN (US); Travis Lumpkin, Minneapolis, MN (US); George Wallace Malheiros, Minneapolis, MN (US); Jordyn Purvins, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 52 days.

(21) Appl. No.: 17/326,439

(22) Filed: May 21, 2021

(65) Prior Publication Data

US 2021/0362564 A1 Nov. 25, 2021

Related U.S. Application Data

(60) Provisional application No. 63/028,144, filed on May 21, 2020.

(51) Int. Cl.
G06Q 10/0832 (2023.01)
B60H 1/00 (2006.01)

(52) U.S. Cl.
CPC ..... B60H 1/00735 (2013.01); B60H 1/00971 (2013.01); G06Q 10/0832 (2013.01)

(58) Field of Classification Search
CPC .......................... G06Q 10/0832; G06Q 10/083
See application file for complete search history.

(56) References Cited

U.S. PATENT DOCUMENTS

2016/0042318 A1* 2/2016 Goodman .............. G06Q 50/28
705/330
2016/0238406 A1* 8/2016 Burtner ................ G06F 16/2322
(Continued)

FOREIGN PATENT DOCUMENTS

WO 2018/099920 6/2018
WO 2020/197640 10/2020

OTHER PUBLICATIONS

Lupo, "Technological evolutions help preserve produce in transportation," Published by Produce Grower, Apr. 2019, Retrieved from https://www.producegrower.com/article/technological-evolutions-help-preserve-produce-in-transportation-food-safety/ (Year: 2019).*

(Continued)

Primary Examiner — Rupangini Singh
Assistant Examiner — Bryan J Kirk
(74) Attorney, Agent, or Firm — Hamre, Schumann, Mueller & Larson, P.C.

(57) ABSTRACT

Methods and systems for conveying or operationalizing data from a transport climate control system (TCCS) that provides climate control within an internal space moved by a vehicle are disclosed. A method includes determining, by a controller of the TCCS, a set of TCCS operational measurements; obtaining, by the controller, a set of TCCS operational settings; determining, by the controller, a set of cargo measurements; creating a shipment performance log based on the set of TCCS operational measurements, the set of TCCS operational settings, and the set of cargo measurements; publishing the shipment performance log to a data (Continued)

repository; and retrieving the shipment performance log to facilitate disposition of goods in the internal space.

15 Claims, 19 Drawing Sheets

(56) References Cited

U.S. PATENT DOCUMENTS

| | | | |
|---|---|---|---|
| 2017/0261237 A1* | 9/2017 | High | F25B 9/04 |
| 2018/0018626 A1* | 1/2018 | Kagawa | G06Q 10/0833 |
| 2018/0347895 A1* | 12/2018 | Jonsson | F25D 29/008 |
| 2019/0102734 A1* | 4/2019 | Kawamukai | G06Q 10/06395 |
| 2019/0180291 A1 | 6/2019 | Schmeling et al. | |
| 2020/0005230 A1* | 1/2020 | Brooks | A23N 15/06 |
| 2020/0019931 A1* | 1/2020 | Prabhakar | H04L 63/102 |
| 2020/0151661 A1 | 5/2020 | Mezaael | |
| 2021/0096572 A1* | 4/2021 | Jang | G06Q 10/0832 |
| 2022/0277261 A1* | 9/2022 | Stollman | G06Q 10/08 |

OTHER PUBLICATIONS

Extended European Search Report, issued in the corresponding European patent application No. 21175262.1, dated Oct. 20, 2021, 10 pages.

Galvez et al., "Future challenges on the use of blockchain for food traceability analysis", Trac Trends in Analytical Chemistry, Elsevier, vol. 107, Aug. 30, 2018, 11 pages.

* cited by examiner

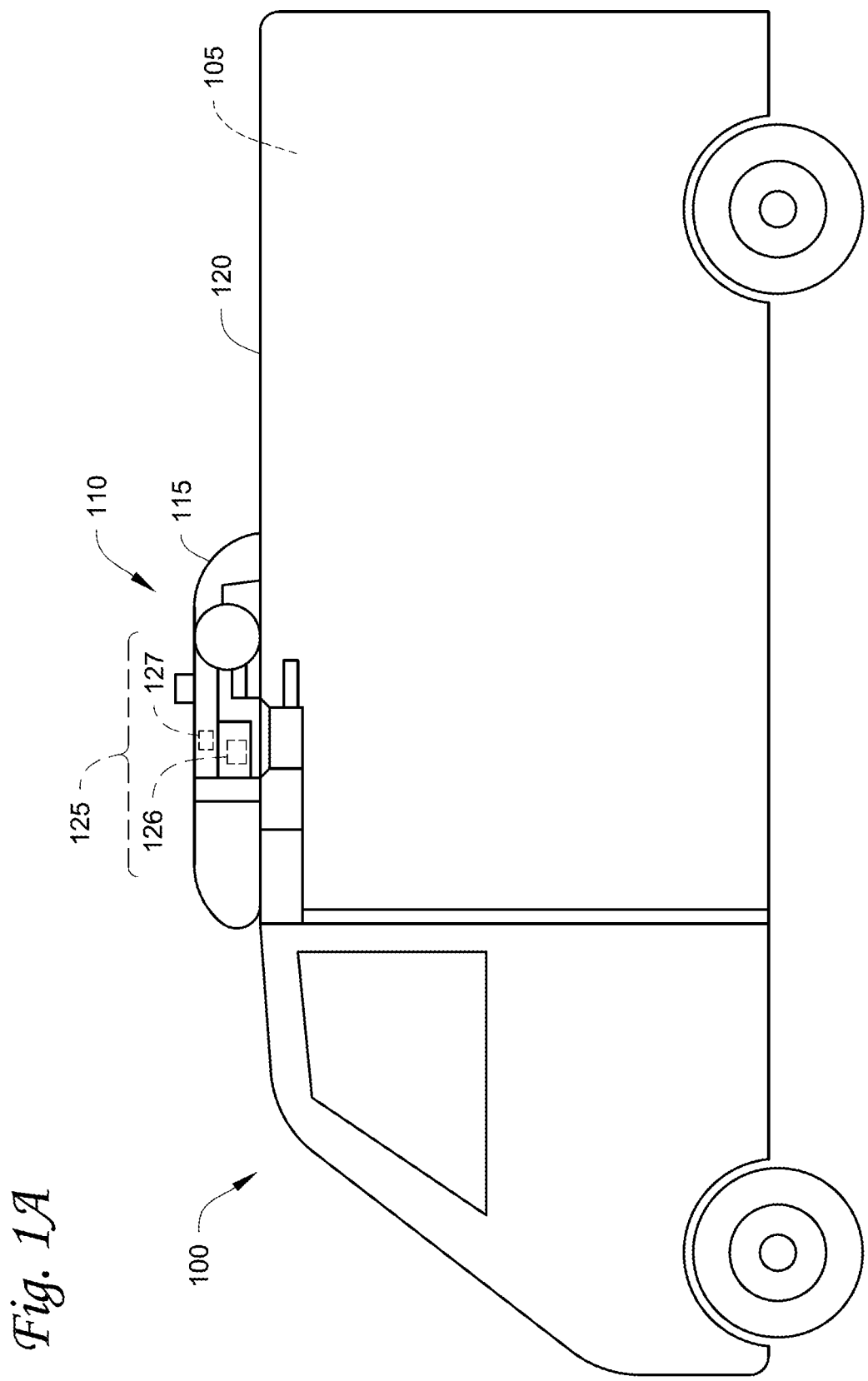

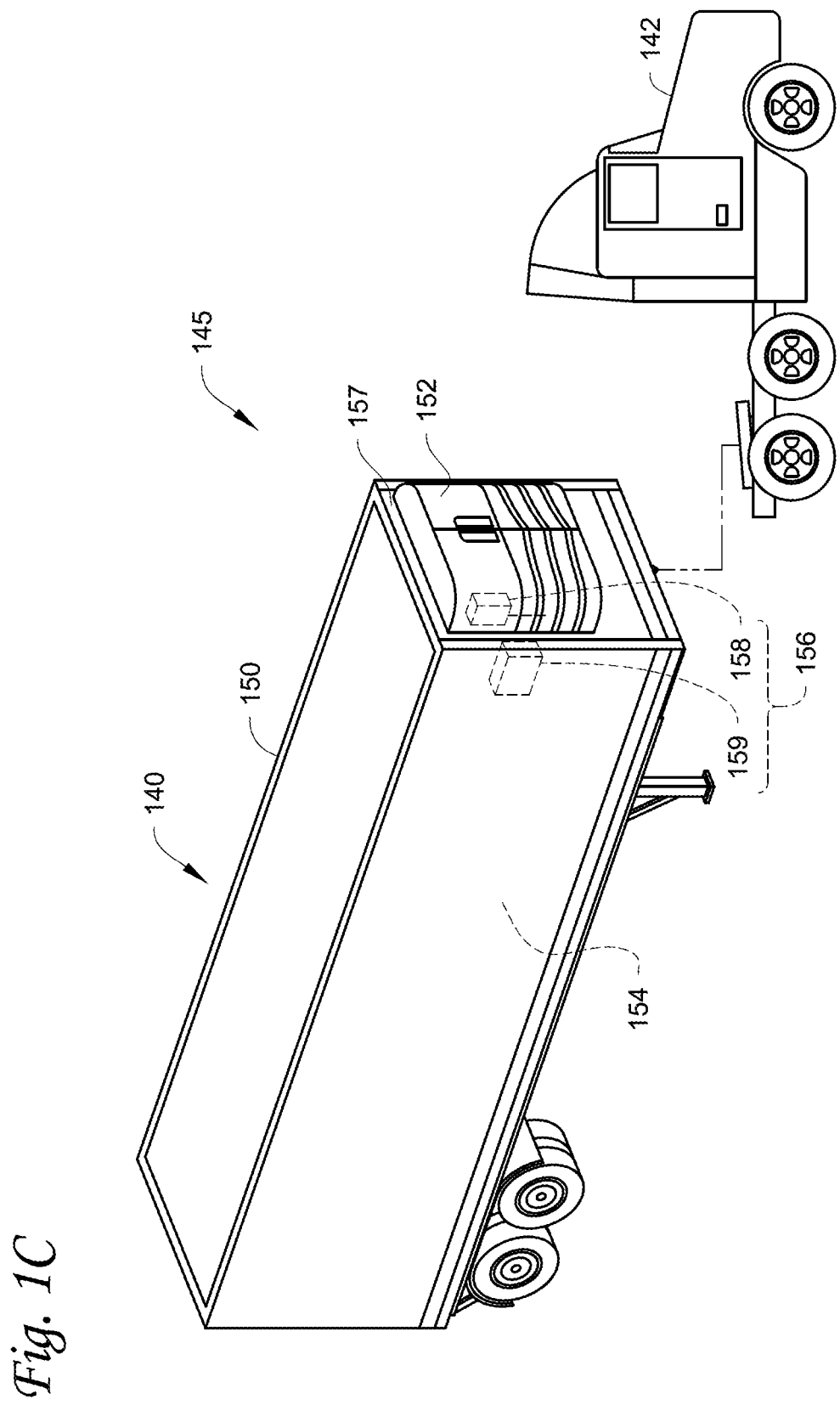

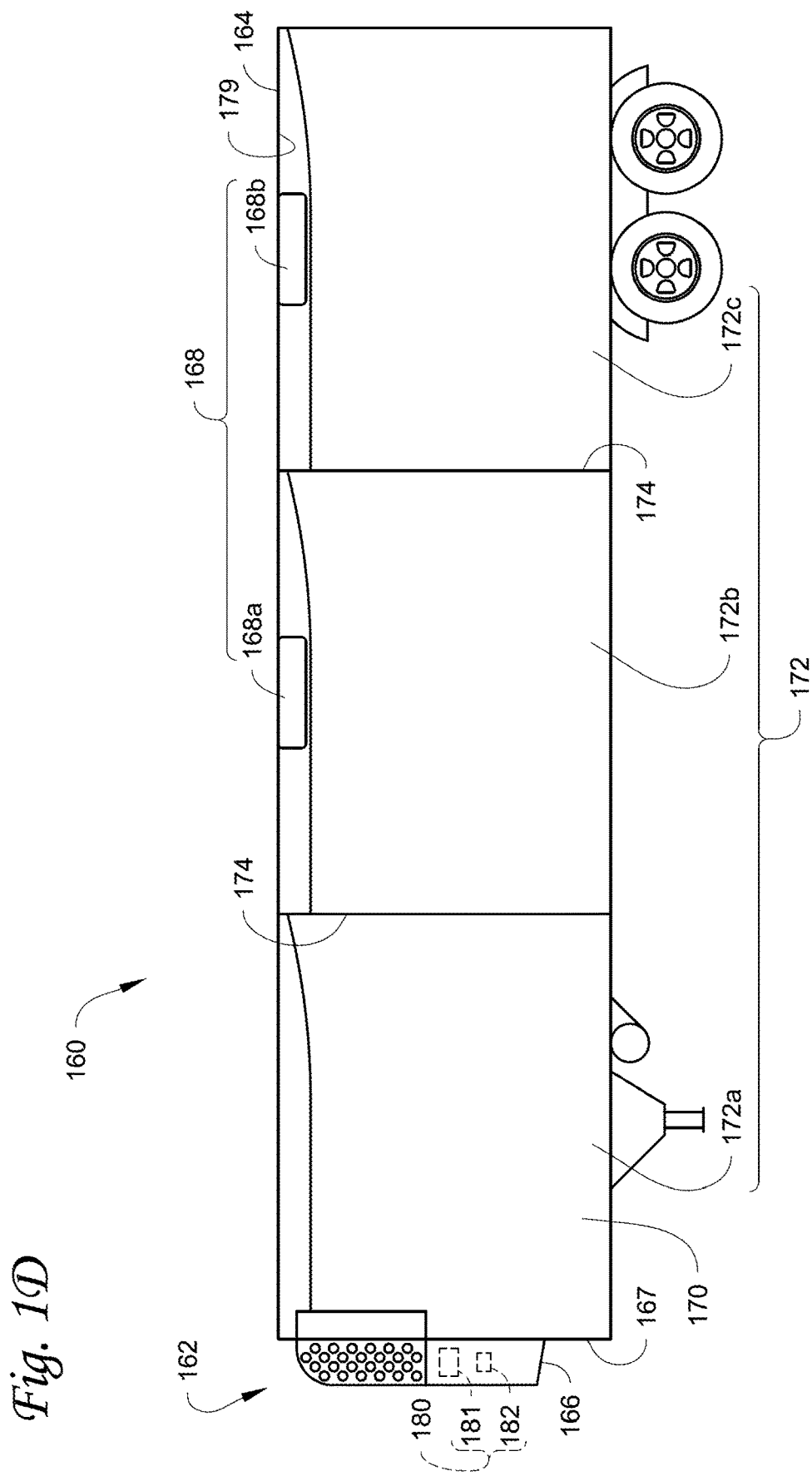

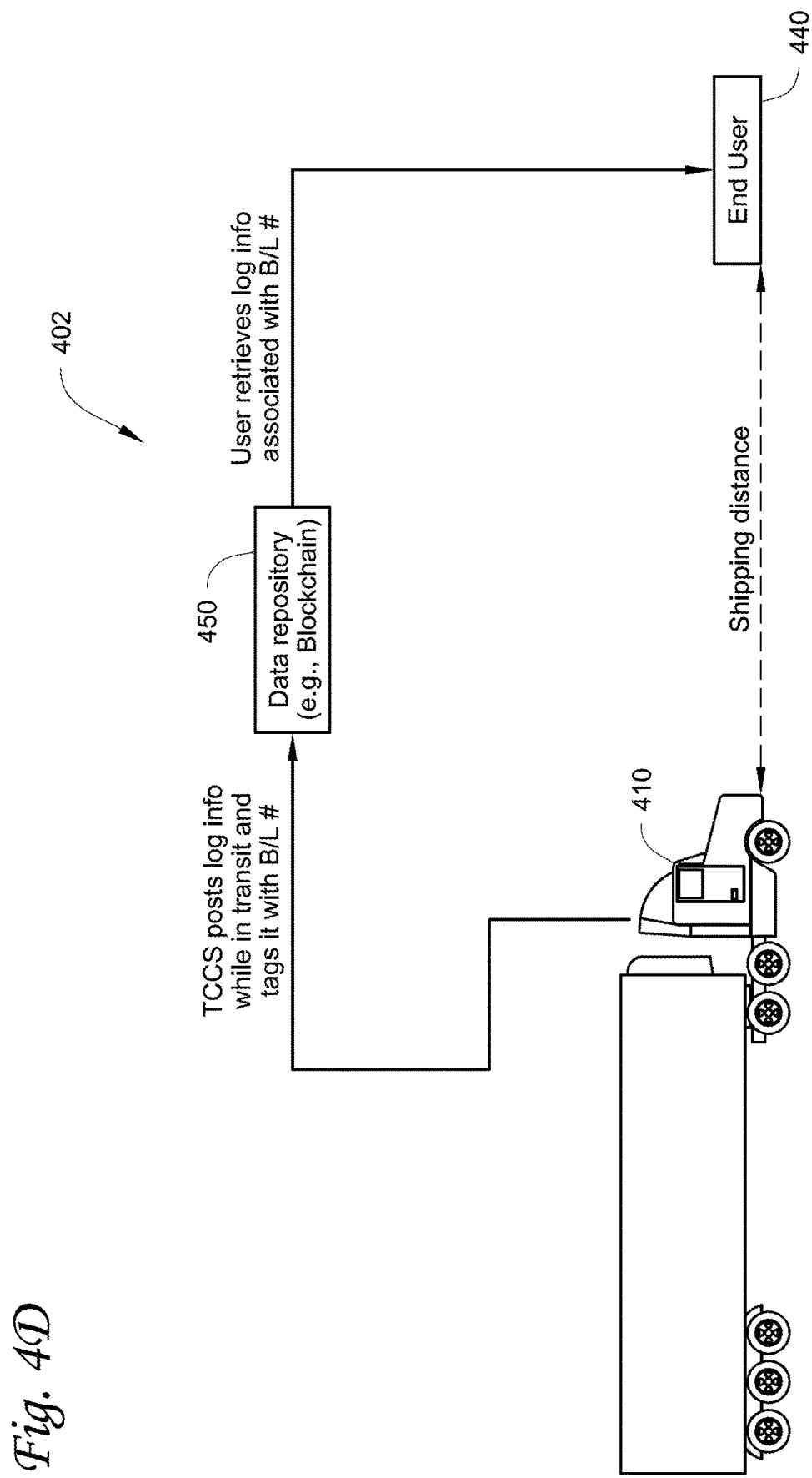

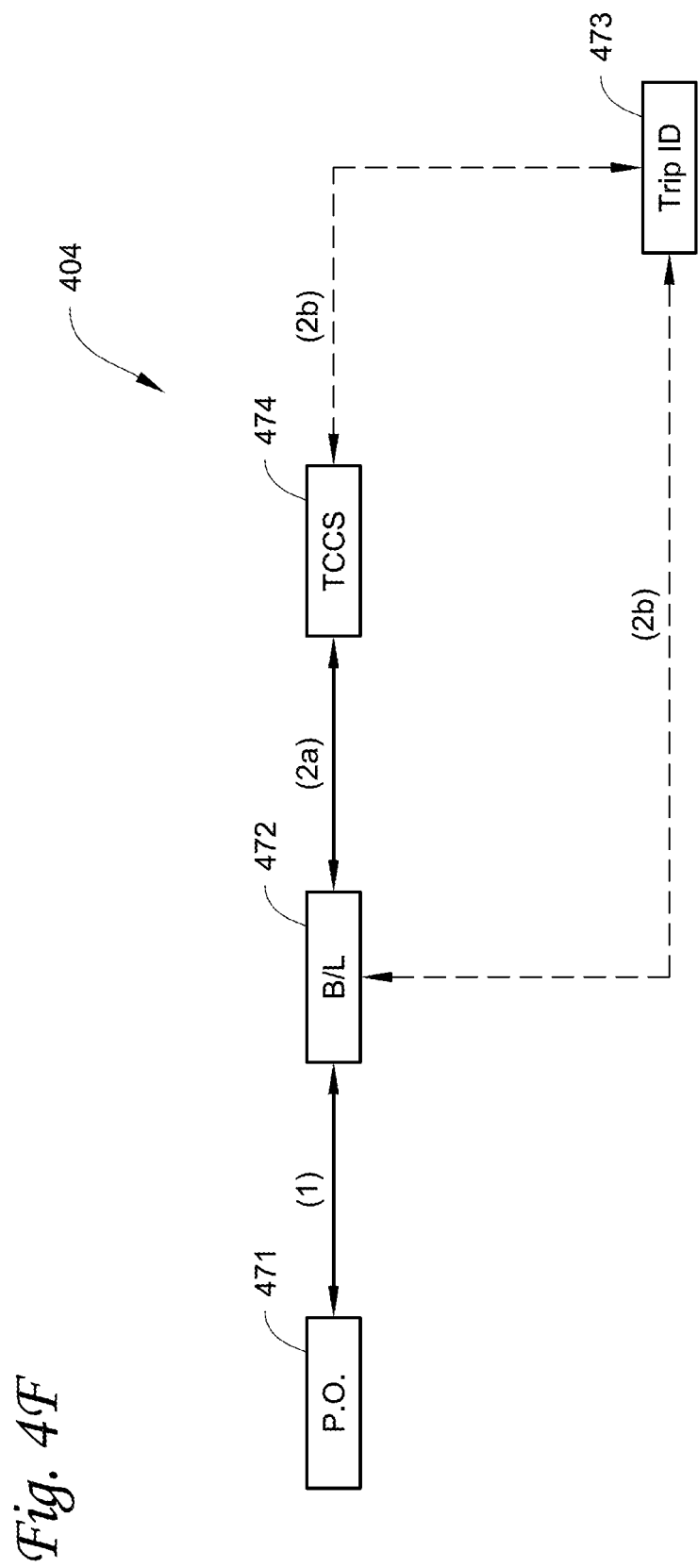

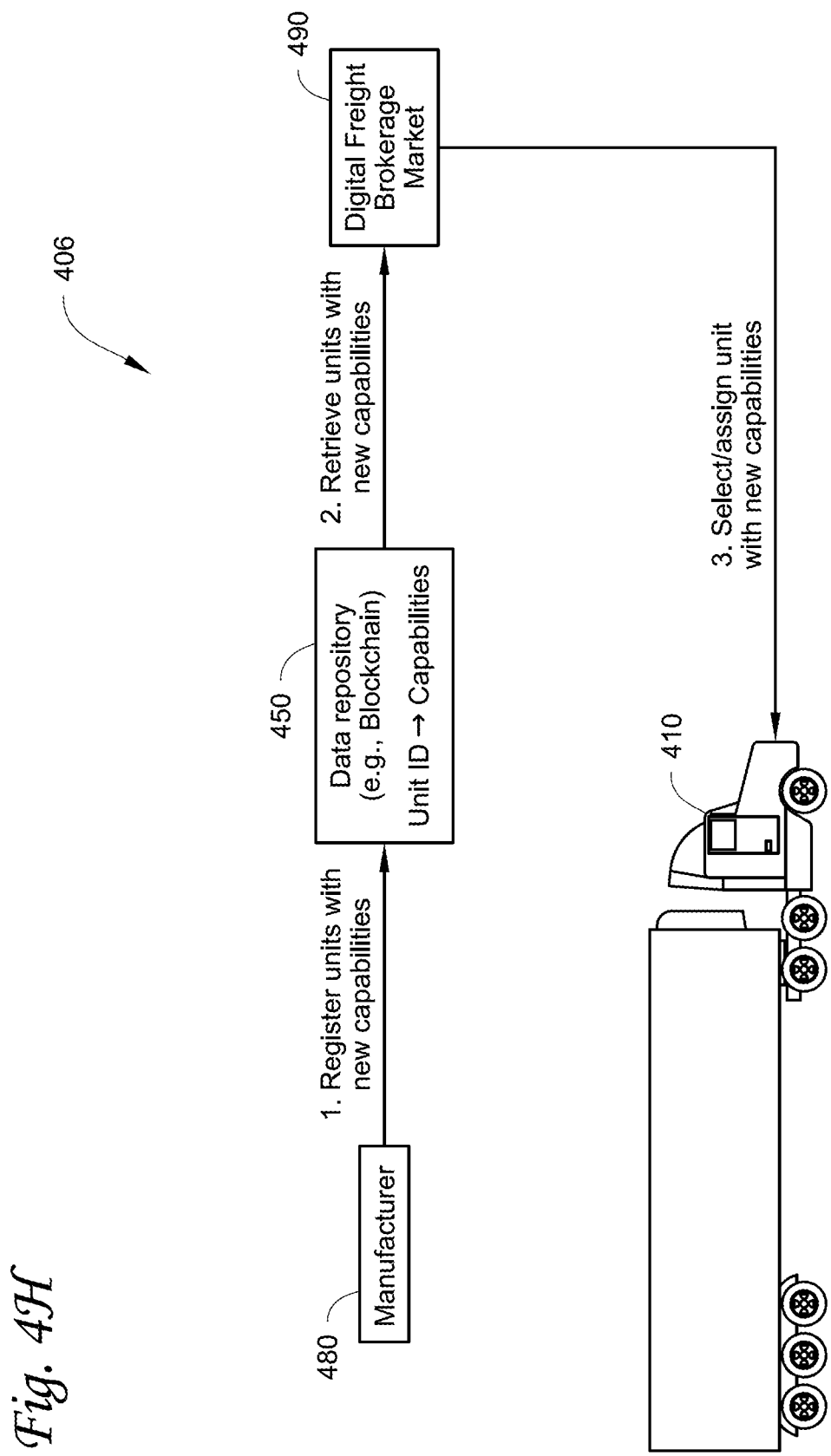

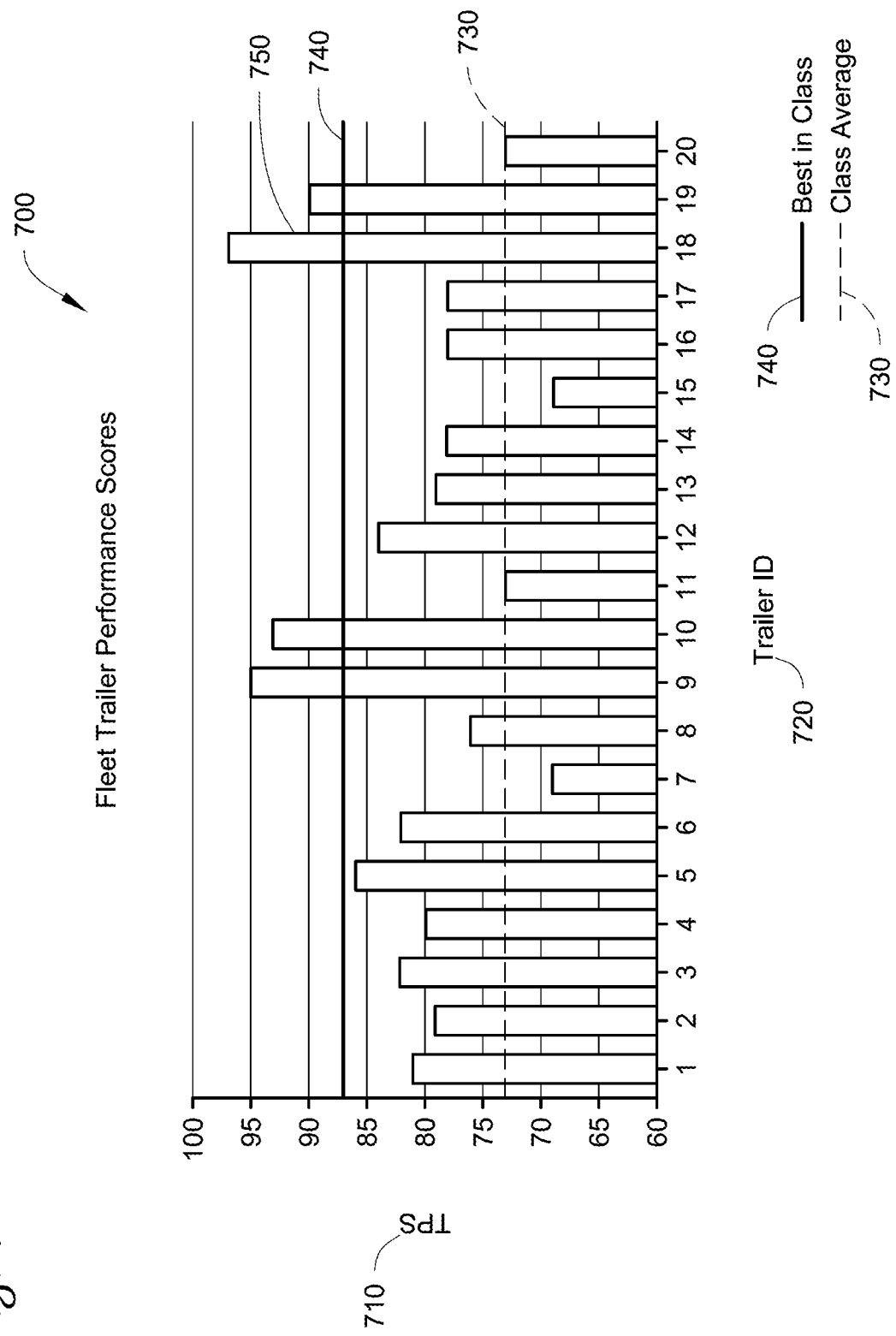

METHODS AND SYSTEMS OF CONVEYING DATA TO AND FROM A TRANSPORT CLIMATE CONTROL SYSTEM

FIELD

The disclosure herein relates to methods and systems of conveying data pertaining to a transport climate control system (TCCS). More specifically, the data pertaining to the TCCS may be collected, generated, obtained, processed, or otherwise handled by the TCCS and/or associated equipment or systems, to various end users or systems via a shared data repository, and/or configuring the TCCS with profile or other operational data from the shared data repository specified by various end users or systems. Data generated or obtained by the TCCS or the profile or other operational data can be disseminated, notarized, shared, or published via the shared data repository (e.g., a database, a group of databases, data warehousing, a public, private, or hybrid ledger such as Blockchain, or the like).

BACKGROUND

A TCCS is generally used to control environmental condition(s) (e.g., temperature, humidity, air quality, and the like) within a climate controlled space of a transport unit (e.g., a truck, a container (such as a container on a trailer, a flat car, an intermodal container, etc.), a box car, a semi-tractor, a bus, or other similar transport unit). The TCCS can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the TCCS can be installed externally (e.g., on a rooftop of the transport unit, on a front wall of the transport unit, etc.).

SUMMARY

The disclosure herein relates to methods and systems of conveying data pertaining to a TCCS. More specifically, the data pertaining to the TCCS may be collected, generated obtained, processed, or otherwise handled by the TCCS and/or associated equipment or systems, to various end users or systems via a shared data repository, and/or configuring the TCCS with profile or other operational data from the shared data repository specified by various end users or systems. Data generated or obtained by the TCCS or the profile or other operational data can be disseminated, notarized, shared, or published via the shared data repository.

It will be appreciated that the shared data repository can include a database, a group of databases, data warehousing, a ledger such as Blockchain (private, public, hybrid, etc.), or the like. It also will be appreciated that "user" or "users" disclosed herein can refer to any suitable parties in a supply chain including farmers, producers, TCCS dealers, shippers, brokers, carriers, distributors, retailers, vendors, operators, receivers, customers, and/or TCCS manufacturers, etc., as well as any suitable systems (e.g., one or more user systems such as data processing systems, etc., or a system with multiple user access levels, interface(s) such as application programming interface, etc.) that the parties use to obtain, generate, convey, use, process, and/or operate data, and the parties actions disclosed herein can be performed by the suitable systems. It will be further appreciated that data generated, obtained, or otherwise handled by the TCCS or an associated system can include data pertaining to the TCCS such as data with respect to the conditions of the cargo load (e.g., produce, frozen foods, pharmaceuticals, etc.), data with respect to the shipment details of a cargo load, data with respect to the conditions and/or configuration of the TCCS or the environment adjacent the TCCS, etc. Also it will be appreciated that profile data can include a set of TCCS parameters to be configured to the TCCS corresponding to a set of requirements specified by various end users or systems.

For inbound shipments of cargo goods arriving at a receiver's site, embodiments disclosed herein can provide the receiver with the visibility to the shipment data and to the process of ascertaining the condition of the inbound cargo in real-time, quickly, easily, and with operational efficiency. It will be appreciated that obtaining cargo condition data in a timely and detailed fashion can enable operational efficiencies (for the receiver) including avoidance of cumbersome communication with carriers, earlier notification about shipments in unacceptable conditions and the ability to order replacements earlier (e.g., prior to the arrival of the damaged shipments), better planning for disposition of inbound shipments (e.g., whether to accept, reject, or inspect the shipments, etc.), reduction in inspections, reduction in operational overhead associated with temporarily "quarantining" shipments until their condition is ascertained, etc. In addition, early information about problems with shipments for the receiver can facilitate early intervention to salvage certain shipments.

Embodiments disclosed herein can also facilitate dissemination and enforcement of climate control profile or refrigeration profile (e.g., settings, preferences), the certification of the capabilities of the TCCS units so that shippers can give preference to those TCCS units enabled with such capabilities, the certification of the condition of the TCCS units by dealers, etc.

In an embodiment, environmental sustainability data (e.g., the amount of $CO_2$ produced for transporting goods) can be tracked to facilitate compliance with regulations, standards (proprietary or public) or certifications (e.g., Green Goods Certification). The embodiment can enable the measurements of environmental impact of the TCCS and enable the linking of the environmental impact of the TCCS to the cargo load. The environmental sustainability data can be disseminated, notarized, shared, or published via a data repository.

In an embodiment, TCCS equipment data can be tracked to facilitate e.g., Equipment Certification. The TCCS equipment data can be disseminated, notarized, shared, or published via a data repository. It will be appreciated that Equipment Certification or Equipment Credentials can have hierarchies. For example, a TCCS manufacturer can certify that certain TCCS dealers are authorized to perform inspections and issue equipment certificates because the dealers meet certain dealer criteria (training, processes, service equipment, etc.). Then the authorized (certified) dealers are able to issue certificates (e.g., this unit has been certified by ABC dealer, who is a certified dealer by the manufacturer) for TCCS units. Published certificates can be presented to prospective buyers of TCCS services, which can be achieved through digital freight brokerage platforms of e.g., digital freight brokers.

In an embodiment, digitally linked acceptance of compliant TCCS equipment to cargo shipment contract requirements can be established for assurance of capability and compliance of TCCS equipment prior to cargo load assignment. Capability or compliance data can include temperature control capability, carbon footprint, fuel or energy consumption, the ability to comply with regulations for noise, emissions limits and zero emissions operations. Capability or compliance data can be stored in the TCCS equipment profile and/or disseminated, notarized, shared, or published via a data repository.

In an embodiment, fleet (or TCCS of a fleet) readiness data can be tracked to facilitate the evaluation of the fleet. The fleet readiness data can include fleet readiness score. The fleet readiness score can be based on forward-looking analytics (e.g., information to be provided before start of the trip). The fleet readiness score can reflect the equipment condition (such as whether the equipment condition can be certified as "good/ready" based on, e.g., maintenance history (well-maintained units or poorly maintained units). A freshness score/data can also be tracked. The fleet readiness data, the freshness score/data, warehouse data, retail store or other building data, etc. can be disseminated, notarized, shared, or published via a data repository.

In an embodiment, the cargo load heat measurement data can be tracked. Different cargo load (e.g., produce) types and freshness may generate different levels of heat and the heat measurement data can provide key insight to e.g., the receiver of the cargo load. The controller of the TCCS can determine the heat generated by the cargo load based on, e.g., the external/ambient temperature, the internal temperature of the cargo space, the weight of the cargo load, and the cooling/heat generated from the TCCS. The heat measurement data can be disseminated, notarized, shared, or published via a data repository.

In an embodiment, TCCS quality control performance data (e.g., temperature control performance data) can be tracked to provide end users information about the quality of the transported cargo goods so that end users can make inspection decisions upon receipt. End users can determine at which grade level an inspection of the received cargo goods should be initiated based on the temperature control performance data. The quality/temperature control performance data can be disseminated, notarized, shared, or published via a data repository.

In an embodiment, reporting data can be tracked to facilitate communication between the TCCS and end users (e.g., carriers, receiving customers, etc.) on information about the integrity of the transported cargo load throughout the carrier's possession of the cargo load within the TCCS. The reporting data can help to provide product (e.g., cargo load) integrity and traceability throughout the product supply chain lifecycle, reduce labor cost for product inspection at point of delivery, save cost of insurance for carriers for product being carried, and reduce claims (e.g., product damage claims) for carriers. The reporting data can be disseminated, notarized, shared, or published via a data repository.

In an embodiment, thermal properties of TCCS (e.g., characteristics of the space being controlled by the TCCS) can be tracked to help to determine e.g., the trailer insulation system performance, the trailer insulation system degradation as it ages, which trailer may fit a particular profile better than others, decisions about trailer replacement and repair, and/or other TCCS operational decisions. The thermal properties of TCCS can be disseminated, notarized, shared, or published via a data repository.

In an embodiment, sensor data can be tracked to provide early visibility into the condition of the cargo. TCCS or the TRU of the TCCS can act as proxy for the transmission of data from sensors embedded in the cargo. Early transmission of the sensors data (e.g., while the cargo is still in transit) can enable early detection and intervention, e.g., rearrangement of cargo to enable proper air flow, repair of the TRU, adjustment of potentially incorrect settings, early ordering of another shipment if the cargo is already unusable, early determination of dispatch at the destination, etc. The sensors data can be disseminated, notarized, shared, or published via a data repository.

In an embodiment, climate control profile (e.g., preferences, parameters) data specified by end users can be automatically enforced by the TCCS (e.g., climate control unit CCU and/or TRU of the TCCS). End users can specify the "how" (refrigeration/operating profile) of the TCCS operation. The controller of the TCCS can retrieve the climate control profile from the bill of lading (or other document) and enforce the climate control profile (e.g., setup the parameters). It will be appreciated that the controller of the TCCS can also retrieve the climate control profile from any other suitable sources, as long as the climate control profile is associated with the shipment (e.g., indexed with the bill of lading number or similar identifying data). Upon completion of the transport, the controller can inject back into the data repository a certificate showing compliance. The climate control profile data and/or the certificate can be disseminated, notarized, shared, or published via a data repository.

In an embodiment, price differentiation based on climate control profiles can be determined to help end users (e.g., carriers of refrigerated loads) to price shipments more accurately, thus creating a more efficient market. Data analytics models, artificial intelligence/machine learning, etc., can help to incorporate knowledge of the TCCS operation, along with e.g., digital freight brokerage platforms. The climate control profile data can be disseminated, notarized, shared, or published via a data repository.

In an embodiment, a freshness score/data can be tracked to assist end users (carriers, cargo receivers, etc.) in improving the freshness score of transported goods. A control algorithm can be used to determine the operating parameters/configuration of a TCCS in order to achieve a particular freshness score. The control algorithm can use the TCCS operation data as well as data such as cargo load, ambient conditions, the insulation of the particular TCCS, etc., and make a recommendation on the climate control profile setting that can minimize cost while meeting the freshness target. The freshness score data can be disseminated, notarized, shared, or published via a data repository.

In an embodiment, a method for conveying data from a TCCS that provides climate control within an internal space moved by a vehicle is disclosed. The method includes determining, by a controller of the TCCS, a set of TCCS operational measurements. The method also includes obtaining, by the controller, a set of TCCS operational settings. The method further includes determining, by the controller, a set of cargo measurements. Also the method includes creating a shipment performance log based on the set of TCCS operational measurements, the set of TCCS operational settings, and the set of cargo measurements. The method also includes publishing the shipment performance log to a data repository, and retrieving the shipment performance log to facilitate disposition of goods in the internal space.

In an embodiment, a method for conveying data from a TCCS that provides climate control within an internal space moved by a vehicle is disclosed. The method includes obtaining a set of TCCS capability data, obtaining a set of TCCS reliability data, and determining a TCCS performance log based on the set of TCCS capability data and the set of TCCS reliability data. The method also includes publishing the TCCS performance log to a data repository, and retrieving the TCCS performance log to facilitate a selection decision of the TCCS.

In an embodiment, a method for specifying and configuring a climate control profile for a TCCS that provides climate control within an internal space moved by a vehicle is disclosed. The method includes publishing a climate control profile to a data repository, and retrieving the climate control profile from the data repository. The method also includes configuring, by a controller of the TCCS, the TCCS with a set of configurations that corresponds to the climate control profile. The method further includes operating the TCCS with the set of configurations.

BRIEF DESCRIPTION OF THE DRAWINGS

References are made to the accompanying drawings that form a part of this disclosure and which illustrate embodiments in which the systems and methods described in this specification can be practiced.

FIG. 1A illustrates a side view of a van with a transport climate control system, according to one embodiment.

FIG. 1C illustrates a perspective view of a climate controlled transport unit, with a transport climate control system, attached to a tractor, according to one embodiment.

FIG. 1D illustrates a side view of a climate controlled transport unit with a multi-zone transport climate control system, according to one embodiment.

FIGS. 4C, 4D, and 4E illustrate a data flow from one user to another user in a supply chain of goods, according to some embodiments.

FIG. 4F illustrates a data flow for associating data with shipment, according to one embodiment.

FIGS. 4H and 4I illustrate a data flow from one user to another user in a supply chain of goods, according to some embodiments.

FIG. 7 illustrates an example of box performance scores of a fleet in a box performance report, according to one embodiment.

Like reference numbers represent like parts throughout.

DETAILED DESCRIPTIONS

Figure 1B:
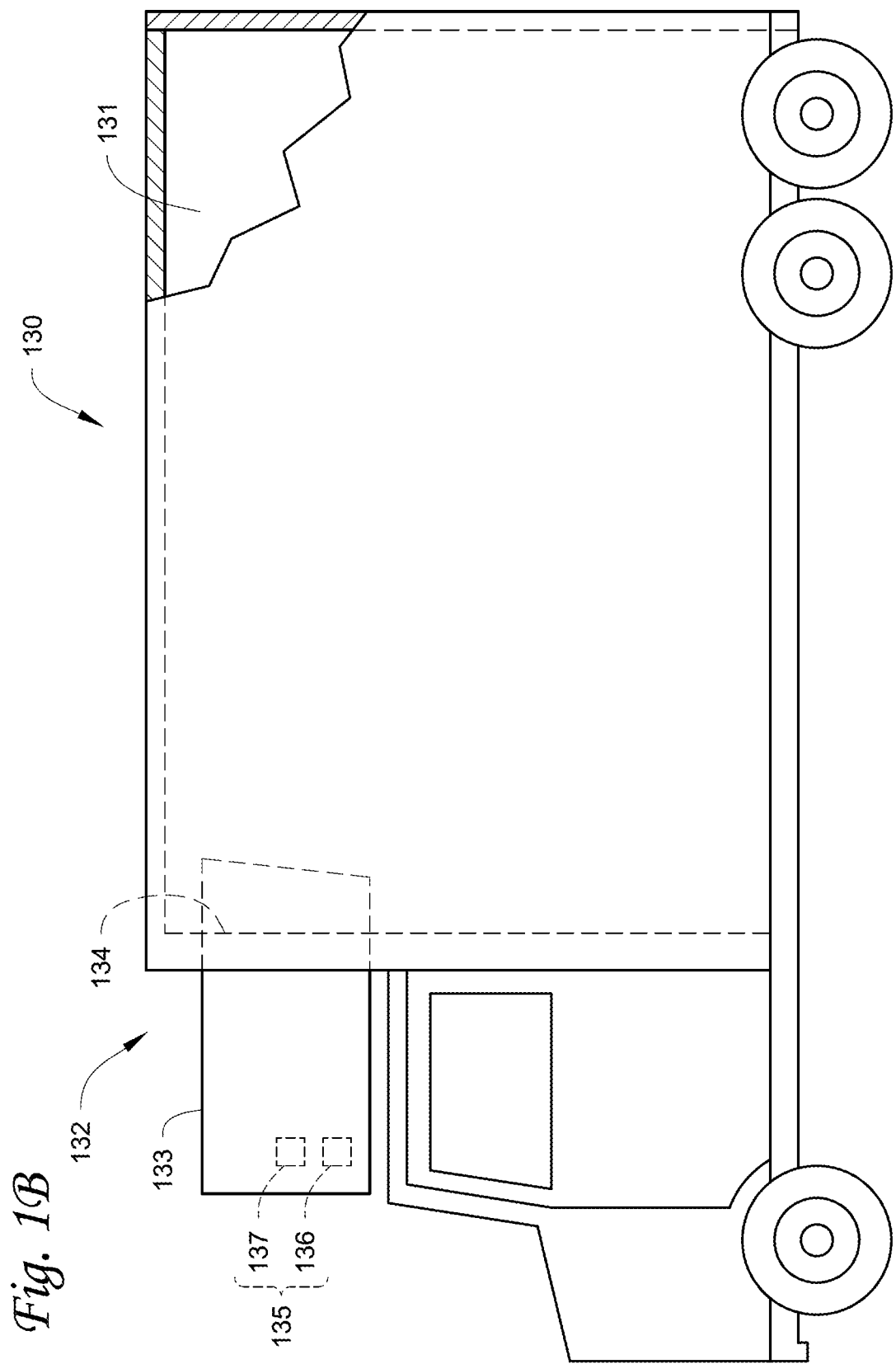
FIG. 1B illustrates a side view of a truck with a transport climate control system, according to one embodiment.

The disclosures herein relate to methods and systems of conveying data pertaining to a TCCS. More specifically, the data pertaining to the TCCS, may be collected, generated, obtained, processed, or otherwise handled by the TCCS and/or associated equipment or systems, to various end users or systems via a shared data repository, and/or configuring the TCCS with profile or other operational data from the shared data repository specified by various end users or systems. Data generated or obtained by the TCCS or the profile or other operational data can be disseminated, notarized, shared, or published via a data repository.

As defined herein, "data repository" refers to a destination designated for data storage. In one embodiment, a data repository includes a database, a group of databases, data warehousing, a ledger such as Blockchain (e.g., public, private, hybrid, etc.), or the like. The data repository can facilitate data storage, data sharing, data mining, and/or data retrieving, etc. Data can be disseminated, notarized, shared, or published via a data repository. "Publish" or "publishing" data in a data repository refers to making the data openly available to the authorized users, and making the data findable, accessible, and/or citable. Publishing (or publish) data to a data repository includes communicating with the data repository using any suitable communications including wired and/or wireless, analog and/or digital communications, following any suitable communication protocols including Transmission Control Protocol/Internet Protocol (TCP/IP), User Datagram Protocol/Internet Protocol (UDP/IP), HyperText Transfer Protocol (HTTP), File Transfer Protocol (FTP), etc., sending data to the data repository, and storing data in the data repository for future access.

It will be appreciated that one of the issues with a data repository is security. In some embodiments, massive amounts of data can be collected in one physical space, but remote backup may be a critical aspect of securing data. Blockchain is a distributed, highly replicated (e.g., with fault-tolerance), secure (e.g., non-forgeable), append-only database shared across multiple parties. It will be appreciated that Blockchain includes a ledger through which data can be added and updated in real-time via consensus of the different nodes running the software in a network. Within Blockchain, once the data is added to the ledger, it cannot be removed or edited.

It will also be appreciated that the process disclosed herein can be conducted by a controller (e.g., the controller of the TCCS), unless otherwise specified. The controller can include a processor, memory, and/or communication ports to communicate with e.g., other components of the TCCS or with equipment or systems located in proximity to the TCCS or the cargo load. The controller can communicate with other components using e.g., powerline communications, Pulse Width Modulation (PWM) communications, Local Interconnect Network (LIN) communications, Controller Area Network (CAN) communications, etc., and using any suitable communications including wired and/or wireless, analog and/or digital communications. In one embodiment, the communication can include communications over telematics of the TCCS, which the TCCS may include or which may be communicatively connected to the TCCS (e.g., telematics equipment, mobile phone, vehicle communication system, etc.). The TCCS can include sensors (e.g., temperature, pressure, humidity, motion, voltage, current, battery status, battery charging level, route-conditions (e.g., uphill, downhill, altitude, elevation, and/or traffic information), etc.) or the TCCS can communicate with sensors associated or embedded with the cargo. The controller can obtain data sensed by the sensors and control the settings of the actuators (valves, fan moors, etc.) and settings of other components of the TCCS. The settings can include configuring e.g., the TCCS operational parameters and/or temperature control settings (e.g., tight/loose temperature control, setpoint temperature, continuous airflow, and/or cycle sentry (start-stop), etc.). In one embodiment, tight temperature control can refer to the control of the deviation/delta of actual temperature of the cargo space from the setpoint temperature so that the deviation is less than or equal to a first predetermined threshold (e.g., +/−2 degrees Fahrenheit) over the trip. Loose temperature control can refer to such control of deviation/delta so that the deviation is greater than the first predetermined threshold (e.g., +/−2 degrees Fahrenheit) but less than or equal to a second predetermined threshold (e.g., +/−4 degrees Fahrenheit) from the setpoint temperature over the trip.

FIGS. 1A-1E illustrate different embodiments of a TCCS. FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (see FIG. 2) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller 125 may comprise a single integrated control unit 126 or may comprise a distributed network of climate controller elements 126, 127. The number of distributed controller elements in a given network can depend upon the particular application of the principles described herein.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (see FIG. 2) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed controller elements in a given network can depend upon the particular application of the principles described herein.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (see FIG. 2) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed controller elements in a given network can depend upon the particular application of the principles described herein.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 170. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 170.

The CCU 166 is disposed on a front wall 167 of the transport unit 164. In other embodiments, it will be appreciated that the CCU 166 can be disposed, for example, on a rooftop or another wall of the transport unit 164. The CCU 166 includes a climate control circuit (see FIG. 2) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a and 168b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 172, etc.) and communicate parameter data to the climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed controller elements in a given network can depend upon the particular application of the principles described herein.

Figure 1E:
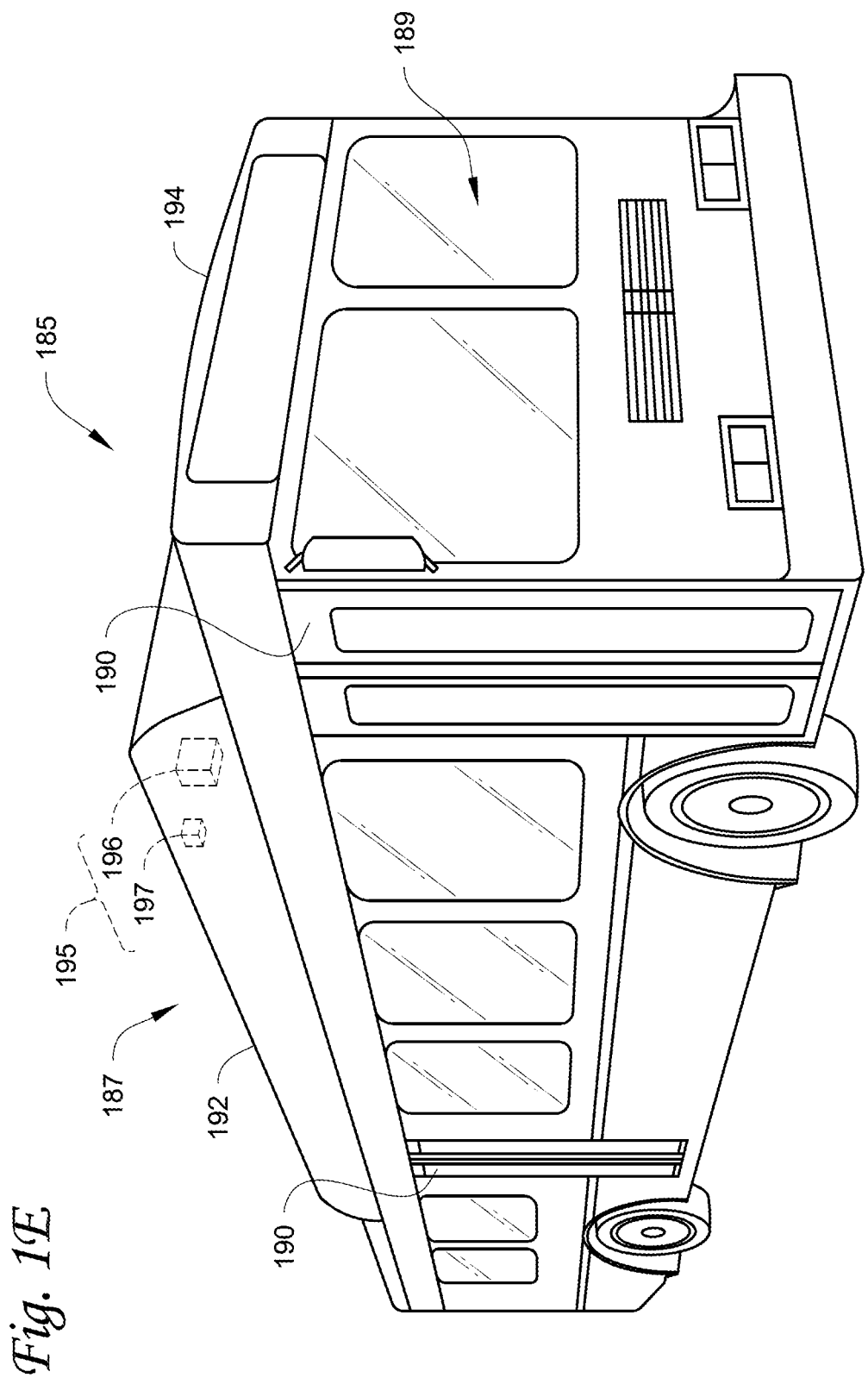
FIG. 1E illustrates a perspective view of a mass-transit vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (see FIG. 2) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed controller elements in a given network can depend upon the particular application of the principles described herein.

Figure 2:
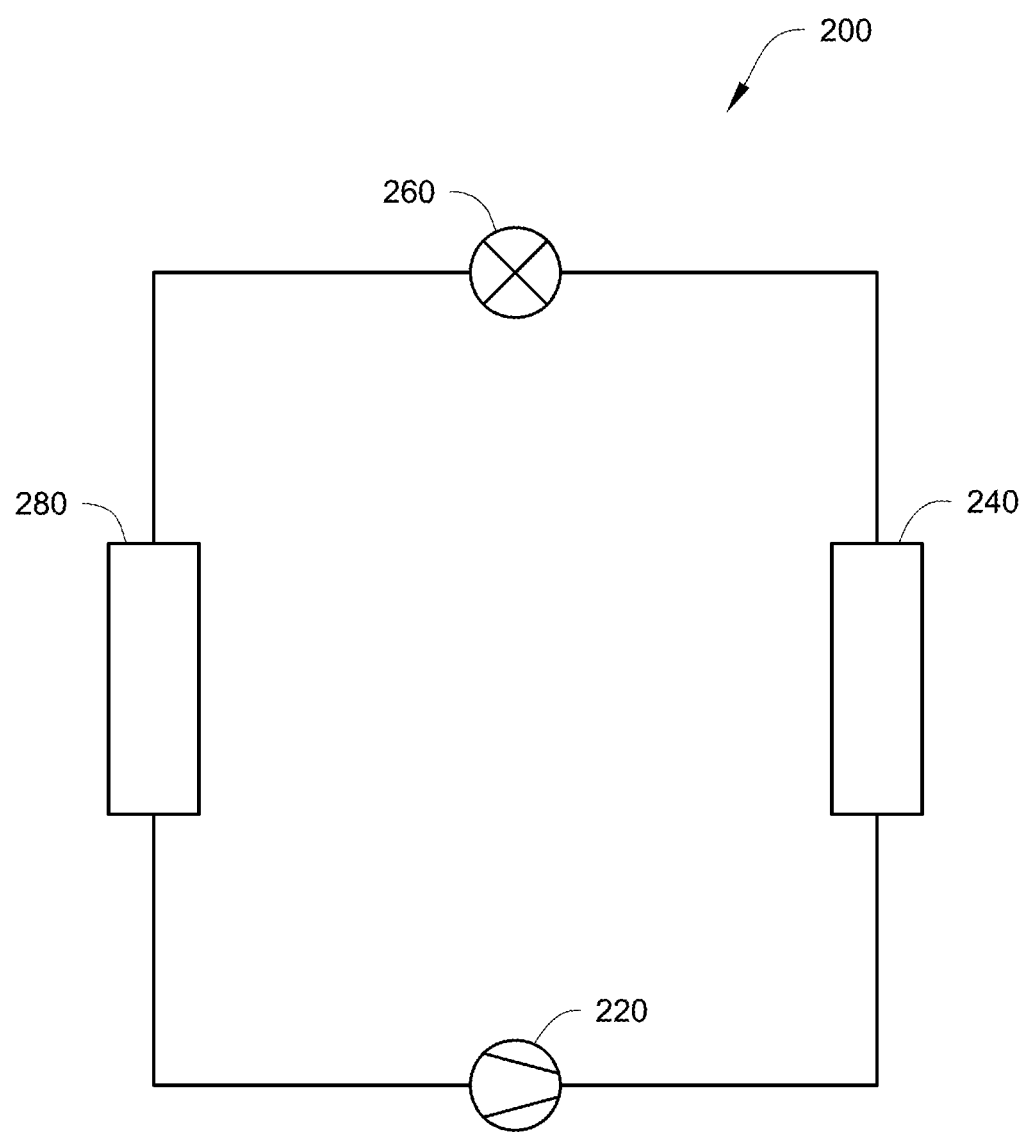
FIG. 2 is a schematic diagram of a climate control circuit, according to one embodiment.

FIG. 2 is a schematic diagram of a climate control circuit 200, according to one embodiment. The climate control circuit 200 can be used, for example, in a TCCS (e.g., the TCCS 110, 132, 145 and 187 and the MTCS 162 shown in FIGS. 1A-E).

The climate control circuit 200 generally includes a compressor 220, a condenser 240, an expansion device 260, and an evaporator 280. In one embodiment, the compressor 220 can be a variable speed compressor.

The climate control circuit 200 is an example and can be modified to include additional components. For example, in an embodiment, the climate control circuit 200 can include other components such as, but not limited to, an economizer heat exchanger, one or more flow control devices, a receiver tank, a dryer, a suction-liquid heat exchanger, one or more condenser fans (blowers), one or more evaporator fans (blowers), one or more sensors, a controller, or the like.

In one embodiment, the one or more condenser/evaporator fan(s) can be two-speed fan(s), fully variable speed fan(s) (i.e., having more than two speeds), low voltage DC fan(s), high voltage AC fan(s), etc. It will be appreciated that a two-speed fan refers to a fan with a high speed and a low speed (typically corresponding to a two-speed engine/generator that drives the fan). The one or more condenser/evaporator fan(s) can be configured to run continuously and/or in a cycle-sentry mode.

The climate control circuit 200 can generally be applied in a variety of systems used to control an environmental condition (e.g., temperature, humidity, air quality, or the like) in a space (generally referred to as a conditioned space). Examples of such systems include, but are not limited to, HVAC systems, transport refrigeration units, or the like. In one embodiment, an HVAC system can be a rooftop unit or a heat pump air-conditioning unit.

The compressor 220, condenser 240, expansion device 260, and evaporator 280 are fluidly connected. In one embodiment, the climate control circuit 200 can be configured to be a cooling system (e.g., an air conditioning system) capable of operating in a cooling mode. In one embodiment, the climate control circuit 200 can be configured to be a heat pump system that can operate in both a cooling mode and a heating/defrost mode.

The climate control circuit 200 can operate according to generally known principles. The climate control circuit 200 can be configured to heat or cool a liquid process fluid (e.g., a heat transfer fluid or medium (e.g., a liquid such as, but not limited to, water or the like)), in which case the climate control circuit 200 may be generally representative of a liquid chiller system. The climate control circuit 200 can alternatively be configured to heat or cool a gaseous process fluid (e.g., a heat transfer medium or fluid (e.g., a gas such as, but not limited to, air or the like)), in which case the climate control circuit 200 may be generally representative of an air conditioner or heat pump.

In operation, the compressor 220 compresses a working fluid (e.g., a heat transfer fluid (e.g., refrigerant or the like)) from a relatively lower pressure gas to a relatively higher-pressure gas. The relatively higher-pressure gas is also at a relatively higher temperature, and is discharged from the compressor 220 and flows through the condenser 240. In accordance with generally known principles, the working fluid flows through the condenser 240 and rejects heat to the process fluid (e.g., water, air, etc.), thereby cooling the working fluid. The cooled working fluid, which is now in a liquid form, flows to the expansion device 260. The expansion device 260 reduces the pressure of the working fluid. As a result, a portion of the working fluid is converted to a gaseous form. The working fluid, which is now in a mixed liquid and gaseous form flows to the evaporator 280. The working fluid flows through the evaporator 280 and absorbs heat from the process fluid (e.g., a heat transfer medium (e.g., water, air, etc.)), heating the working fluid, and converting it to a gaseous form. The gaseous working fluid then returns to the compressor 220. The above-described process continues while the heat transfer circuit is operating, for example, in a cooling mode.

Figure 3:
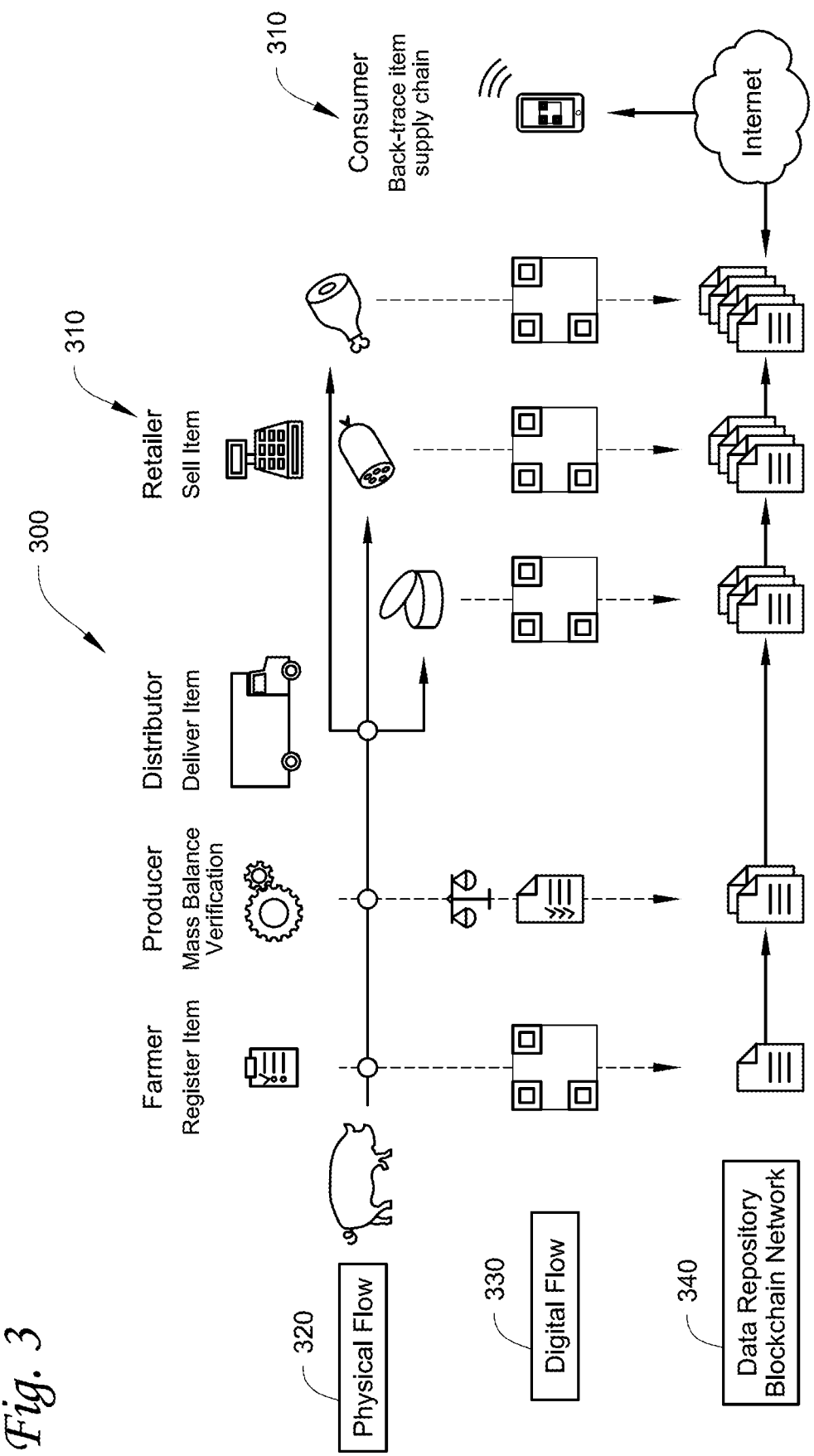
FIG. 3 is a schematic diagram of a physical flow and a digital flow of goods in a logistics and supply chain application, according to one embodiment.

FIG. 3 is a schematic diagram of a physical flow 320 and a digital flow 330 of goods in a logistics and supply chain application 300, according to one embodiment.

Users 310 in the application 300 include farmers, producers (e.g., goods process plant), manufacturers (e.g., pharmaceutical companies, biotechnology companies, TCCS manufacturers, etc.), distributors, retailer, customers, carriers (not shown), etc. Goods can be transferred from one user to another along the physical flow 320. Each user 310, when possessing the goods, can create and/or add/append digital records (e.g., Green Goods certification, etc.) of the goods. The digital records of the goods can be transferred from one user to another along the digital flow 330, or can be accessed/published in a shared data repository by any authorized user without transferring the data. The digital records of the goods can be disseminated, notarized, shared, and/or published via the data repository 340. An end user (e.g., customer of the goods) can access the digital records of the goods created/appended by any other users in the application 300.

It will be appreciated that Blockchain uses distributed ledger technology (e.g., non-centralized governance) and can be applied in the field of logistics and supply chain for goods (e.g., food, pharmaceuticals, etc.) provenance, goods supply chain tracking/traceability, etc. using digital paperwork.

Figure 4A:
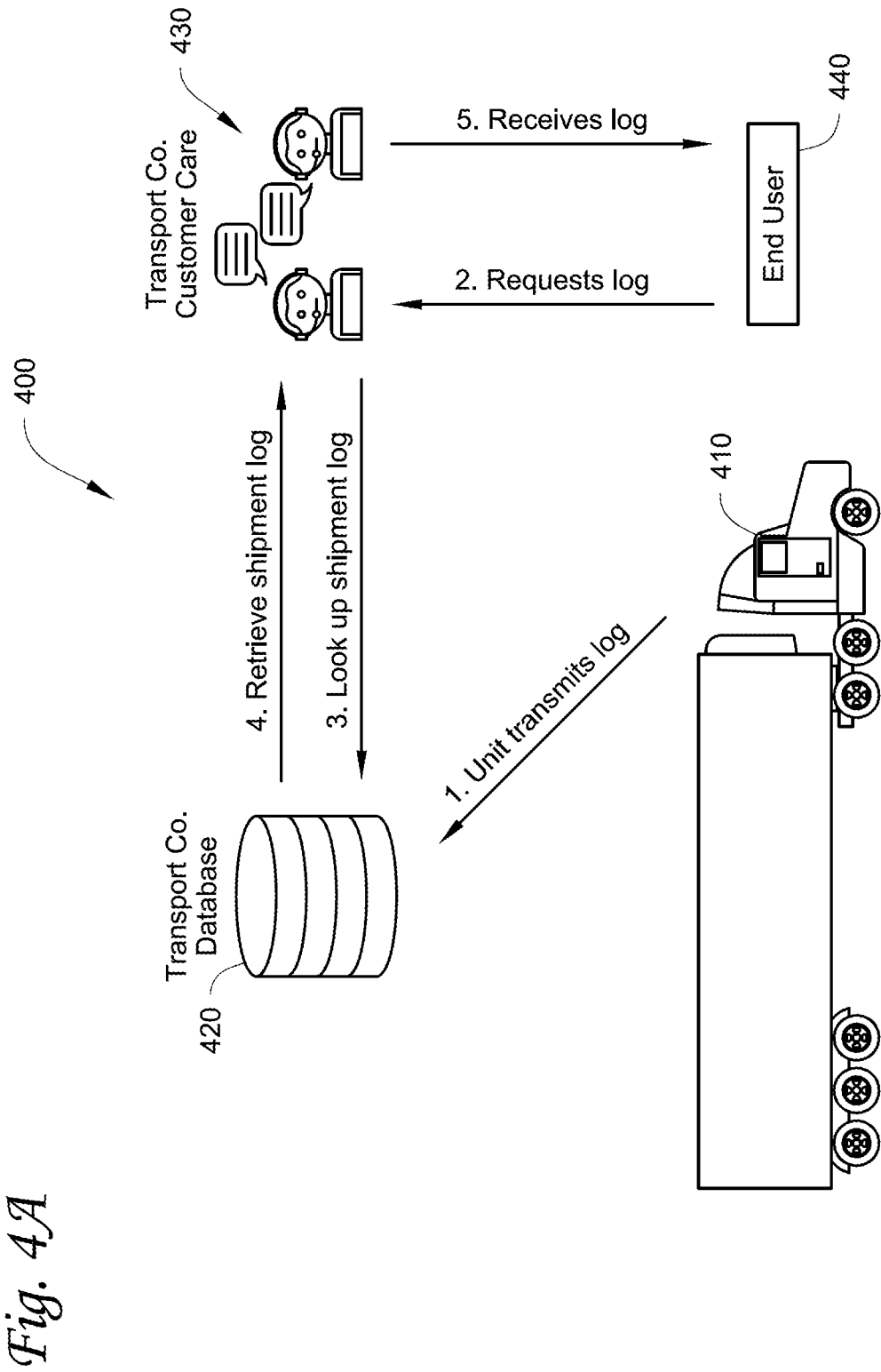
FIG. 4A illustrates a data flow from one user to another user in a supply chain of goods.

FIG. 4A illustrates a data flow 400 from one user (e.g., a carrier) 410 to another user (e.g., a receiver of the goods such as a retailer) 440 in a supply chain of goods.

In the data flow 400, the user (e.g., an operator such as a driver of a vehicle having a TCCS transporting the goods) 410 ships a cargo load (e.g., goods) to the user (e.g., receiver of the goods such as a retailer) 440. The user 440, upon arrival of shipment, automatically or manually scans the cargo load and retrieves data from e.g., cargo-embedded sensors (if available), and requests a transport refrigeration unit (TRU) log (or TCCS log). The TRU log can include information of the TCCS such as the TCCS operational parameters and/or temperature control settings (e.g., tight/loose temperature control, setpoint temperature, continuous airflow, and/or cycle sentry (start-stop), etc.). The TCCS log can also include information about the temperature maintained in the temperature controlled space during the transportation (as that temperature is measured by, for example, the return air temperature sensors that feed data into the controller). The TRU log can include e.g., alarms and alerts highlighting conditions of concern programmed into the controller by the TRU manufacturer. The user 410 can send/save the TRU log to a database (e.g., transport company's database) 420. To retrieve the TRU log, the user 440 can contact the user (e.g., transport company's customer care department) 430, and the user 430 retrieves the TRU log and sends the TRU log to the user 440. It will be appreciated that the TCCS log can be sent automatically (e.g., without driver intervention). Furthermore, this action may be performed asynchronously with respect to the end-user 440 (in other words, the TCCS log transmission to the carrier may happen automatically and not necessarily be triggered by an end-user request). This transmission typically uses a communications mechanism (e.g., telematics). Embodiments disclosed herein can help the user 440 to have easier/more direct access to the info (such as the TRU log, etc.), earlier/timelier access to the info, and access to more info.

Figure 4B:
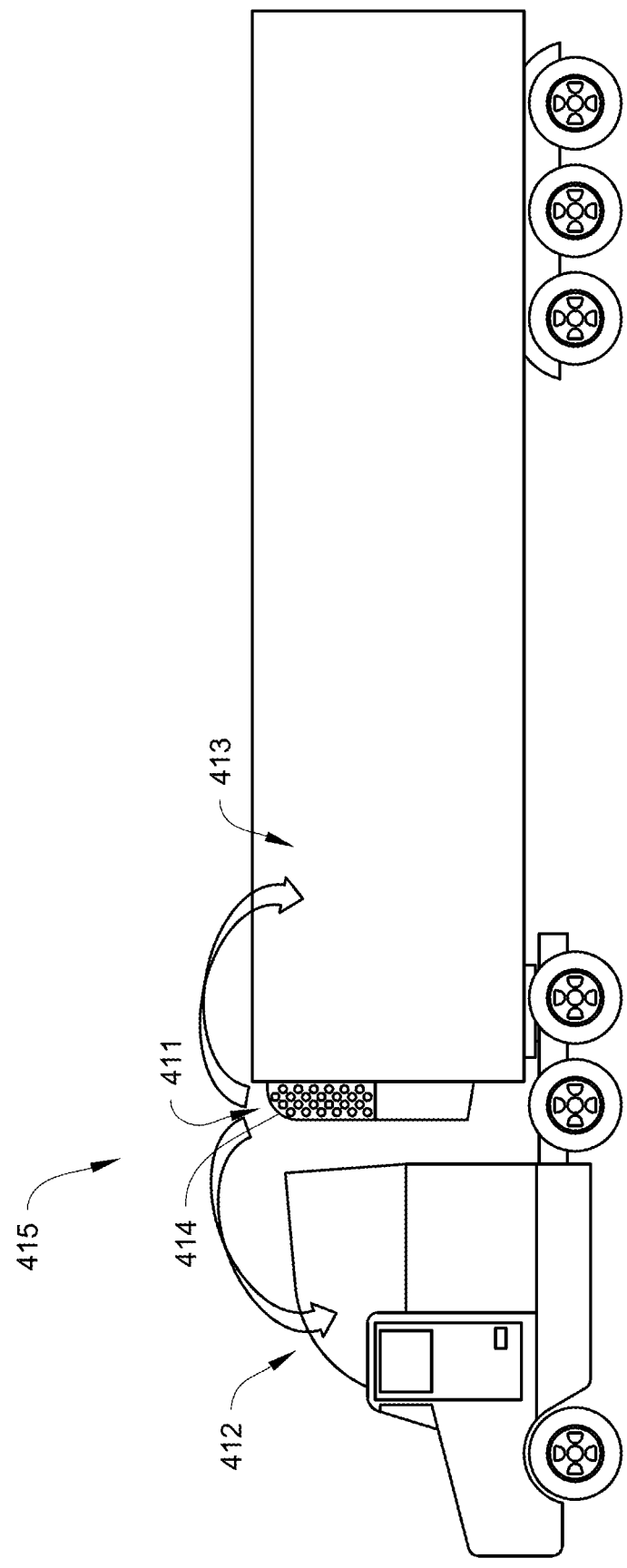
FIG. 4B is a schematic diagram of a TCCS, according to one embodiment.

FIG. 4B is a schematic diagram of a TCCS 415, according to one embodiment. The TCCS 415 includes a CCU 411 including telematics 414, transportation assets 412, and a cargo 413. Embodiments disclosed herein can facilitate the association of information/data from the CCU 411 with the transportation assets 412, and the association of information/data from the CCU 411 with the cargo 413 and the owner/receiver of the cargo. It will be appreciated that historically, the data from the TCCS has been associated with the transportation assets (trailers, tractors, etc.) and typically transmitted to the owner of those assets (e.g., transportation company), even though the data is of primary relevance to the cargo. That is, the industry has historically been doing what is easier (sending the data to the party that remains the same across trips—the owner of the transport assets) rather than what is more useful (sending the data to the party that changes from one trip to the next—the recipient of the refrigerated goods).

It will also be appreciated that the data repository (e.g., Blockchain including servers, database/ledger, etc.) can reside in e.g., the cloud. The TCCS can include a client application (e.g., Blockchain client application) that communicates with the data repository (e.g., via the telematics 414 over e.g., cellular, WiFi, or any other suitable wired or wireless communication) to deposit data into and retrieve data from the data repository. The client application can be running on the controller or on the telematics device 414 or on other suitable component of the TCCS. Communication to/from the TCCS can be over cellular, short range radios (WiFi, Bluetooth, etc.) or other suitable communication media.

Figure 4C:
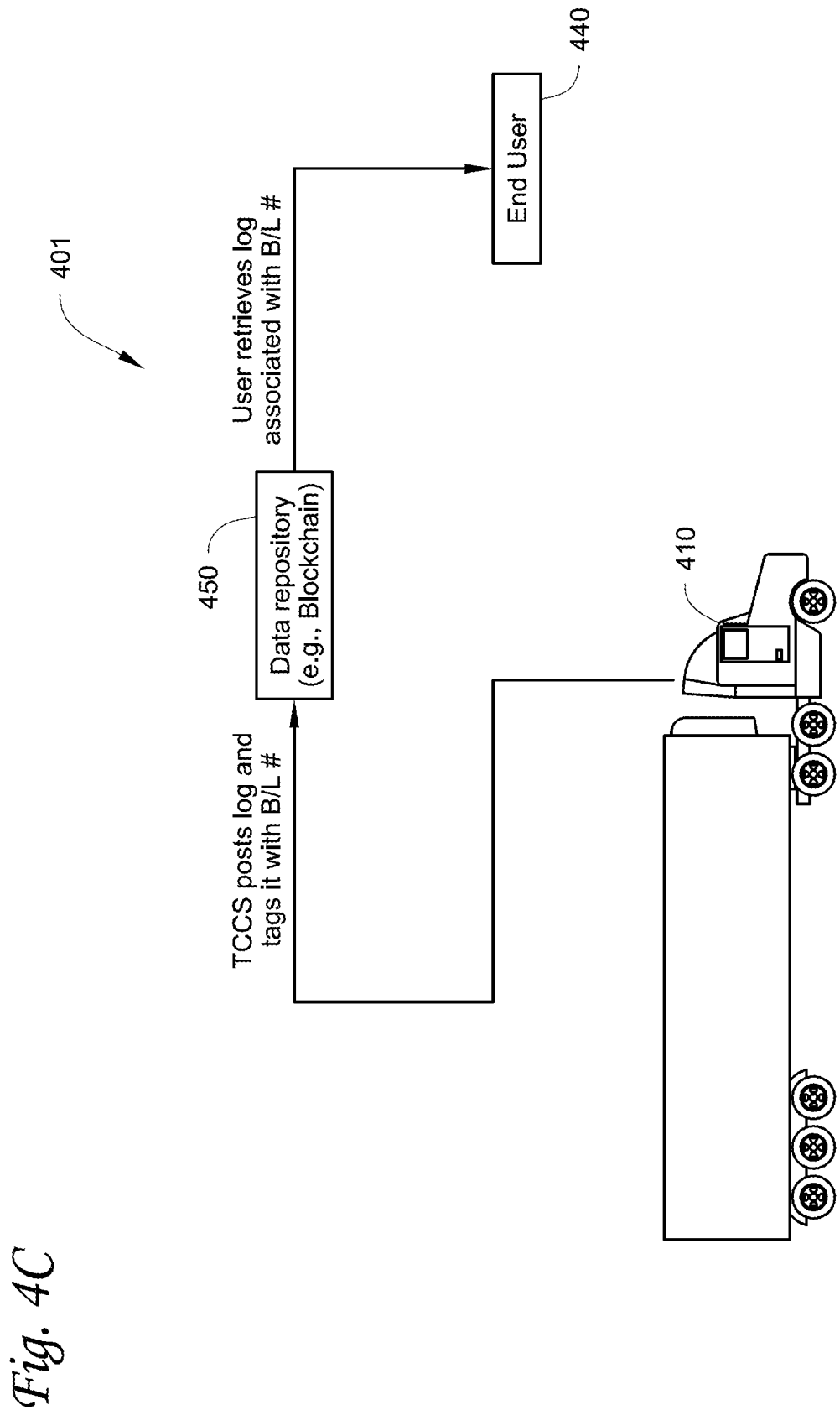
Figure 4E:
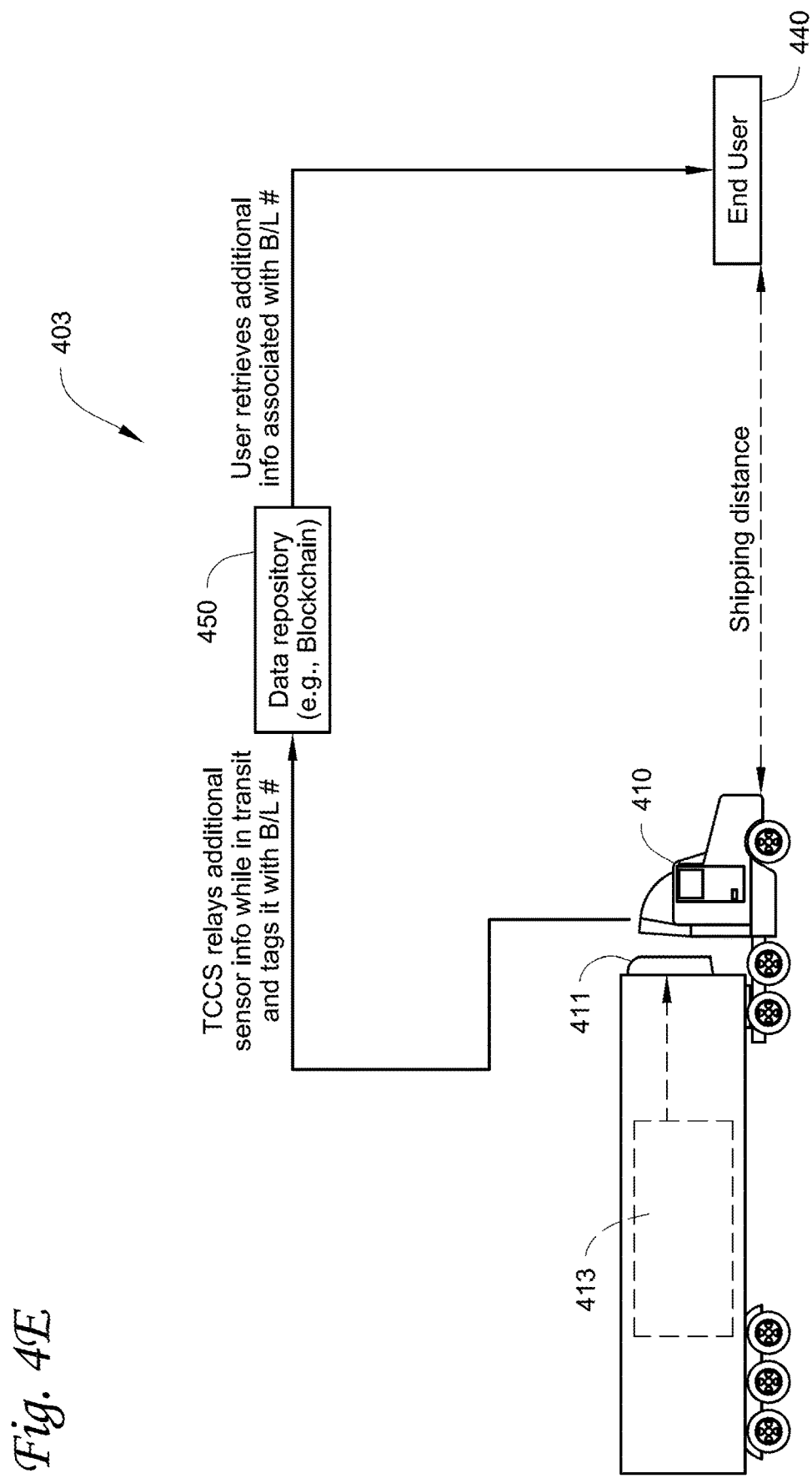

FIGS. 4C, 4D, and 4E illustrate a data flow 401/402/403 from one user (e.g., a carrier) 410 to another user (e.g., a receiver of goods such as a retailer) 440 in a supply chain of goods, according to some embodiments.

The user (e.g., an operator such as a driver of a vehicle having a TCCS transporting the goods) 410 or the TCCS can post information such as the shipment performance log on a data repository 450. The Bill of Lading (B/L) number (of the transported goods) can be used to tag the record (B/L number can be used as a record key) of the shipment performance log. The user (e.g., receiver of the goods such as a retailer) 440 can retrieve the shipment performance log associated with the B/L number from the data repository. Embodiments disclosed herein can enable the user 440 direct and easy access to data (e.g., the shipment performance log), without manual labor involvement, without unnecessary delays, without involvement of carriers, and without restrictions on time and location of access, etc.

As shown in FIGS. 4D and 4E, data (e.g., the shipment performance log) transmission and retrieval can occur while cargo is still in transit. Embodiments disclosed herein can provide the user 440 early notification of potential issues of the cargo. Embodiments disclosed herein can facilitate the user 440 with better planning for disposition of arriving cargo (e.g., to decide whether to accept, inspect, or reject the cargo based on the shipment performance log), avoidance of temporary cargo hold while waiting for resolution, early reordering to avoid stock-outs if shipment is to be rejected, and/or potential early intervention to save the cargo if problem is detected early. In FIG. 4E, various data (e.g., sensor data) can be provided and posted on the data repository 450 by the user 410 or the TCCS (including the CCU 411 and the cargo 413).

It will be appreciated that FIG. 4D shows the transmission of data obtained directly by the TCCS from sensors during the trip; the data can include data from sensors on the TCCS itself (e.g., return air temperature, which indicates the temperature in the refrigerated space) as well as data from other sensors attached to the trailer and connected to the TCCS (e.g., permanently associated with the TCCS). In contrast, FIG. 4E shows sensors that are embedded in the cargo. These sensors are typically embedded by the shipper and record temperature across the entire journey, which may have multiple segments (the particular TCCS may manage only one of the segments of the trip) and may also involve storage at intermediate facilities. These cargo-embedded sensors are typically read at the destination upon arrival; some cargo-embedded sensors are equipped with cellular chips to transmit during the trip, but these sensors can be very expensive. It is more common to use cheaper logging sensors and retrieve the logs at the destination either by plugging the sensors into a reader device or via a short-range radio like Bluetooth. As shown in FIG. 4E, if such a cargo-embedded sensor has Bluetooth (see the Bluetooth logo in the middle of the cargo in FIG. 4E), it may be possible to communicate with the TCCS (which has Bluetooth capabilities) so that the TCCS can retrieve logs from the cargo-embedded sensor and relay that log to the data repository (using the TCCS's cellular connection, etc.). Thus, the customer can obtain the logs from the cargo-embedded sensors before arrival. Furthermore, the logs in the cargo-embedded sensors may also hold information from prior legs/stages of the trip (where the particular TCCS may not have been involved); the TCCS can relay even that information to the data repository, so that the end customer can retrieve said information before arrival.

It will be appreciated that various metrics can be obtained/determined by the controller of the TCCS to capture e.g., the "ageing" of the cargo/compliance with targeted conditions, or events of interest (such as warm loading, door openings, etc.). The TCCS can also act as proxy for the transmission of data from e.g., cargo-embedded sensors. Cargo-embedded sensors can transmit sensed data to TRU/TCCS via short-range radio (e.g., Bluetooth, Wi-Fi, near-field communication (NFC), ultra-wideband (UWB) and IEEE 802.15. 4, etc.), and TRU/TCCS can relay data to the data repository 450. Embodiments disclosed herein can help the user 440 to obtain cargo sensor data earlier and more easily (e.g., even from before loading of the cargo goods on the TRU/TCCS).

FIG. 4F illustrates a data flow 404 for associating data with shipment, according to one embodiment. At 471, a user (e.g., a retailer) can issue purchase orders (P.O.) to another user (e.g., a vendor of the goods). The vendor can hire a transport company (e.g., a carrier). At 472, the transport company can issue a B/L, which includes a P.O. number (previously created and provided by e.g., the retailer to the vendor). Any suitable user (e.g., the retailer, the vendor, or the carrier) can enter an association between the P.O. number and the B/L into the data repository. At 474, vendor or carrier can enter the association between the B/L and the TRU/TCCS into the data repository. Or as an alternative, at 473, a TRU/TCCS user interface can be used to receive the B/L or generate a unique trip-ID for the B/L (and the trip-ID may be associated with the B/L). The TRU/TCCS can subsequently associate all transport information with the B/L or the trip-ID. Embodiments disclosed herein can facilitate the association of all the information with shipment.

Figure 4G:
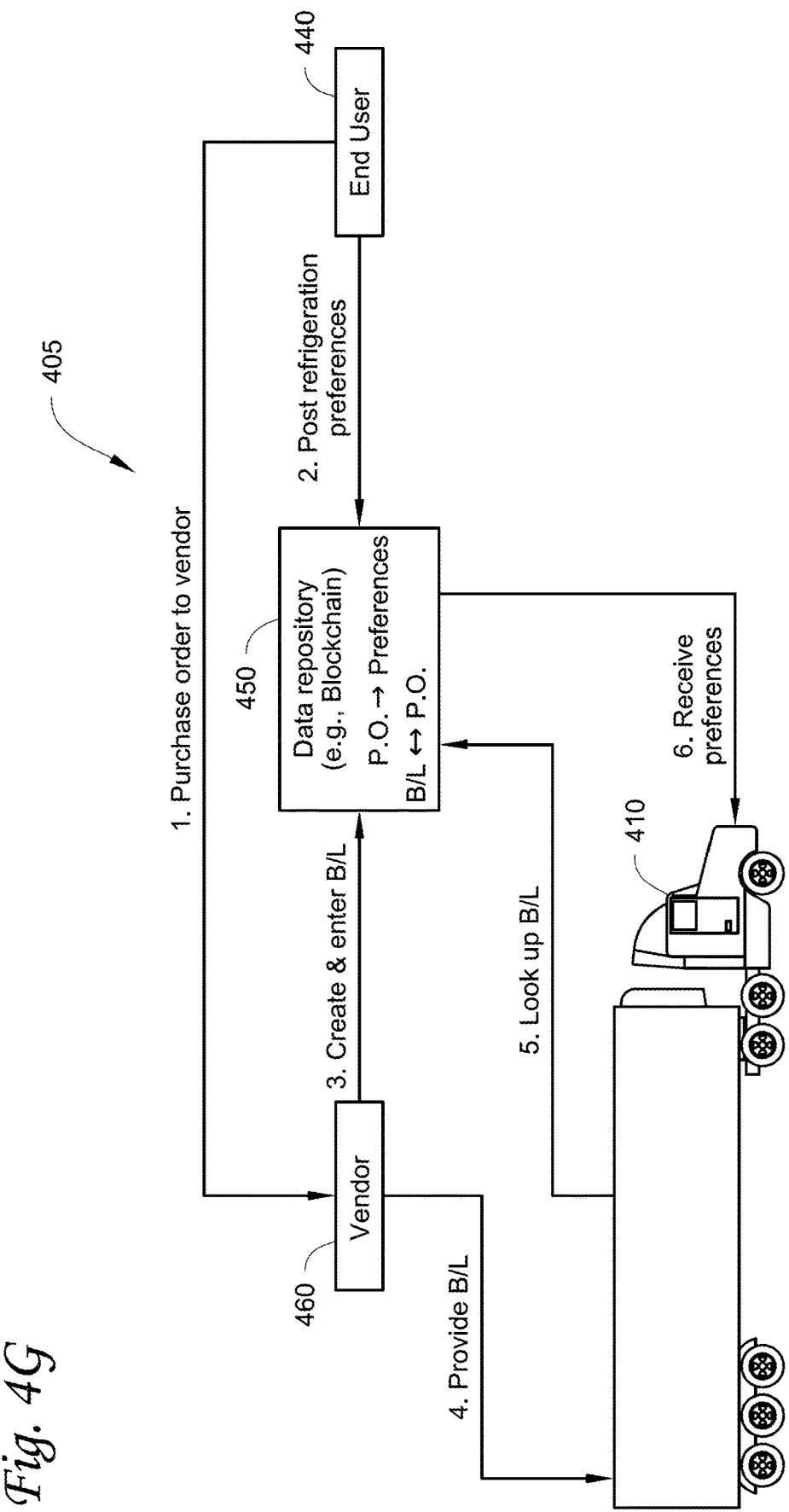
FIG. 4G illustrates a data flow for configuring a climate control profile, according to one embodiment.

FIG. 4G illustrates a data flow 405 for configuring a climate control profile, according to one embodiment. The user (e.g., an operator such as a driver of a vehicle having a TCCS transporting the goods) 410 can specify and configure the climate control profile (e.g., preferences such as temperature, air flow, etc.). Embodiments disclosed herein can help the user (e.g., receiver of the goods such as a retailer) 440 to specify the climate control profile, and the user 410 can receive, enforce, and report compliance with such climate control profile (preferences). It will be appreciated that the climate control profile can also be associated with the shipment (such as the B/L, the P.O. number, etc. as described in FIG. 4F). It will be appreciated that the actions of the user(s) can be automated. For example, if the TCCS knows the B/L number, the TCCS can look the B/L number up in the data repository and retrieve the associated profile (e.g., using the cellular connection of the TCCS, etc.).

As shown in FIG. 4G, the customer 440 sends P.O. to the vendor 460, and posts climate control profile to the data repository 450. The vendor 460 creates and enters B/L to the data repository 450 and provides the B/L to the carrier 410. The carrier 410 searches the data repository 450 for the B/L, and retrieves the climate control profile associated with the B/L from the data repository 450.

Figure 4I:
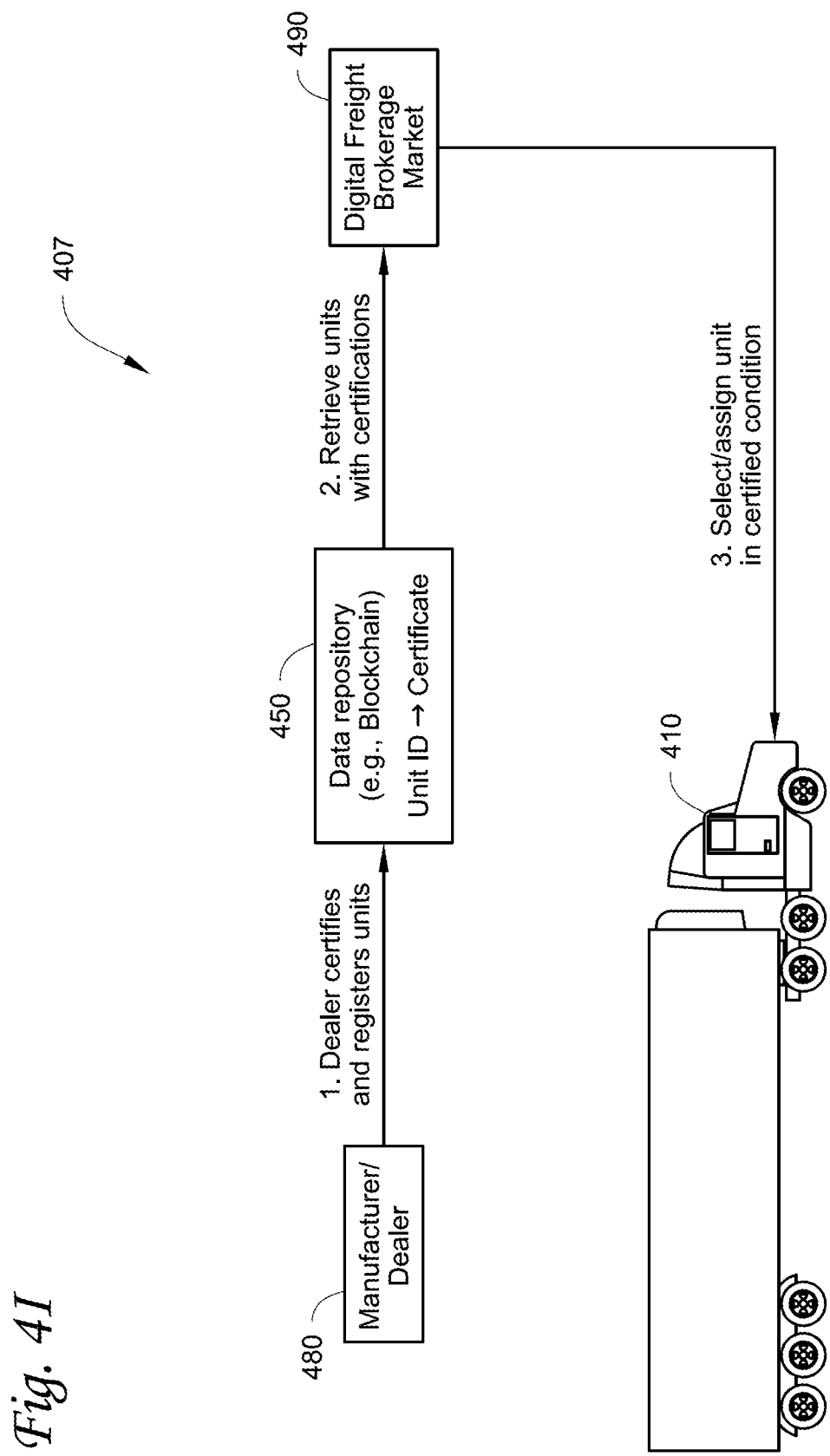

FIGS. 4H and 4I illustrate a data flow 406/407 from one user (e.g., a TCCS manufacturer) 480 to another user (e.g., a carrier) 410 in a supply chain of goods, according to some embodiments. The user 480 can register TCCS units with, e.g., new capabilities (FIG. 4H) on a data repository 450. Another user (e.g., transport companies or digital freight brokers) 490 can select TCCS unit (of the user 410) with the new capabilities. The user 480 (FIG. 4I) can also provide certification for the condition of the TCCS units. Embodiments disclosed herein can help the user 490 to select certified TCCS unit (of the user 410) to achieve risk reduction for the vendor and/or retailer, and achieve potentially lower insurance costs.

As shown in FIGS. 4H and 4I, the user 480 registers the TCCS unit with new capabilities (FIG. 4H) or certifies/registers (FIG. 4I) the TCCS unit in a data repository 450. The user 490 retrieves the TCCS with the new capabilities (FIG. 4H) or with certifications (FIG. 4I) from the data repository 450, and selects/assigns the TCCS unit of the carrier 410 with new capabilities (FIG. 4H) or in certified condition (FIG. 4I).

It will be appreciated that in FIG. 4I, the user 480 can include the TCCS manufacturer or the dealer. The dealer of the TCCS units can be authorized (e.g., by the manufacturer) with the technical capability and credentials to inspect and certify TCCS units and create the TCCS units condition certificates. The entity issuing the certificates can be either the manufacturer itself or the authorized dealers of the manufacturer. In FIG. 4I, it can be the dealer itself that issues the unit certificate (under authorization/accreditation by the manufacturer).

Figure 5:
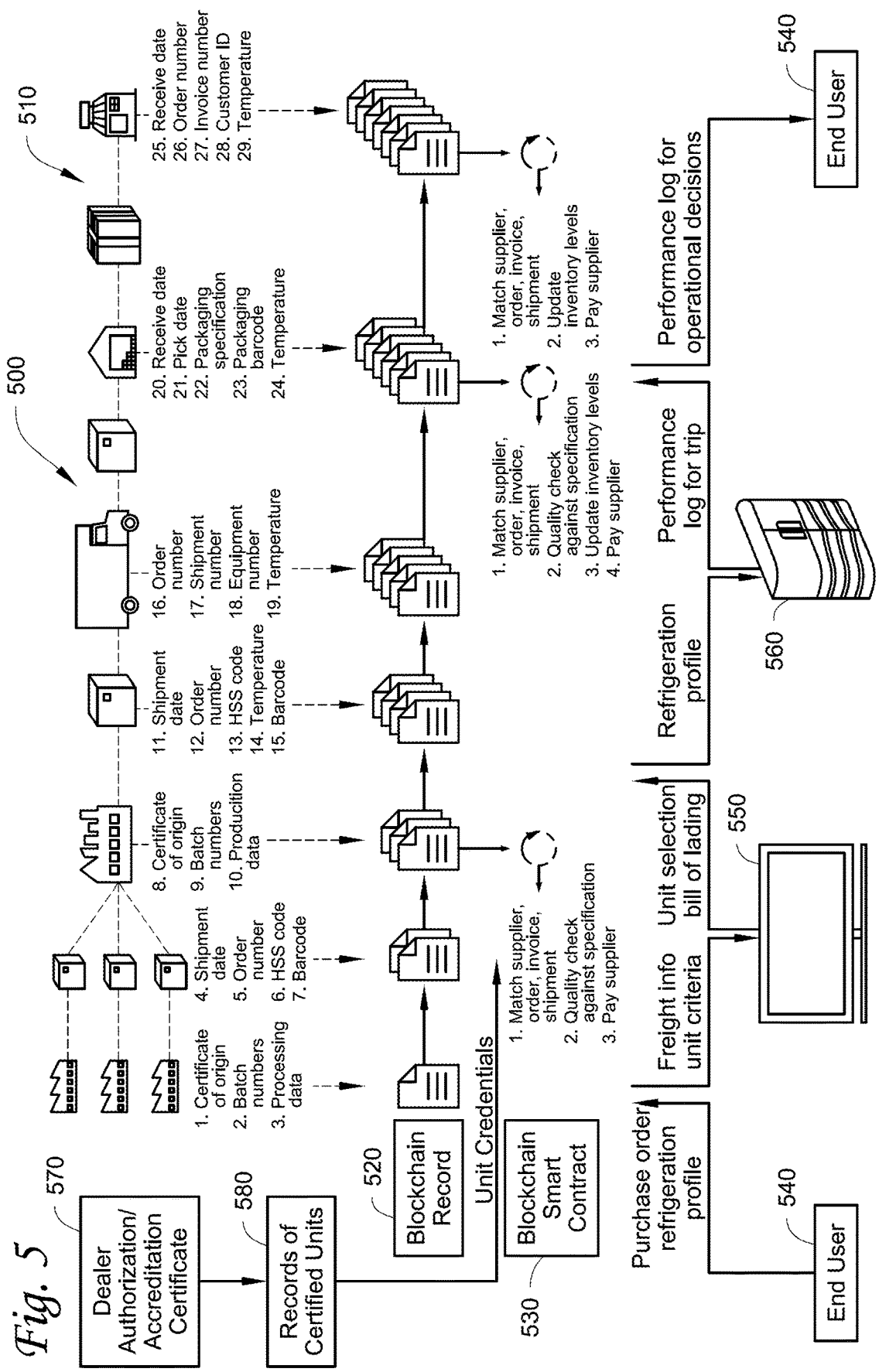
FIG. 5 is a schematic diagram of a digital flow of goods in logistics and supply chain application, according to one embodiment.

FIG. 5 is a schematic diagram of a digital flow of goods in logistics and supply chain application 500, according to one embodiment. The application 500 can be a combination (an overall application) of the digital flow of goods illustrated in FIGS. 3 and 4C-4I. The user 540 can be the user 440 (e.g., receiver of the goods such as a retailer, etc.) of FIGS. 4C-4I. The user 550 can be the transport company of FIG. 4F, a digital freight broker, etc. The user 560 can be the user 410 (e.g., a carrier, etc.) of FIGS. 4C-4I. The users 510 can be the users 310 (e.g., farmers, producers, distributors, retailer, customers, carriers, etc.) of FIG. 3 and the users of FIGS. 4C-4I (e.g. manufacturer, carrier, broker, retailer, vendor, etc.). The data repository 520 can be the data repository 450 of FIGS. 4C-4I. The smart contract 530 can include the association 404 of FIG. 4F.

The top portion (520 and above) of FIG. 5 shows the digital flow of the goods, and the lower portion (530 and below) of FIG. 5 shows interactions between users and the smart/digital contract on the goods. A user (e.g., a dealer of the TCCS) can inspect TCCS units and create records (e.g., inspection records) and/or certifications of the TCCS units at 570 for certification and/or at 580 for inspection records of certified TCCS units. Block 570 shows the certification/authorization of the TCCS dealer by the TCCS manufacturer (so that the dealer can demonstrate its credentials as an authorized dealer and thus prove that it can issue unit condition certificates). Block 580 denotes the unit condition certificate. For example, when a transport company finds a unit condition certificate (580) in the data repository, the company can check to see if the TCCS unit has been issues by an accredited entity/dealer by looking up the dealer's authorization/accreditation certificate (570), which the dealer has received from the manufacturer. The records and certificates can be published on the data repository such as Blockchain, etc. Another user 540 (e.g., receiver of the goods) can send a configuration preference file (e.g., climate control profile, including requirements such as the setpoint temperature of the goods during transportation) to the data repository. Then the user 550 (e.g., shipper, digital broker, or transport company, etc.) knows the user 540's requirements on transporting the goods, and can find such a TCCS unit 560 that matches the capability preferences (e.g., Blockchain-enabled, capable of certain temperature accuracy, etc.) and has the inspection certifications. When the TCCS is identified and the data (e.g., identification) of the TCCS is published into the data repository, the TCCS can retrieve the climate control profile from the data repository. The TCCS can also generate a performance log for the trip and publish the performance log to the data repository for the access of the user 540.

Embodiments disclosed herein represent non-limiting examples of the implementation of the systems and methods of FIGS. 1-5. In an embodiment, environmental sustainability data (e.g., the amount of $CO_2$ produced for transporting goods) can be tracked to facilitate e.g., Green Goods Certification. Goods can be certified as "Green Goods" when e.g., the amount of $CO_2$ produced during the processes of growing, production, transportation, etc. is below or does not exceed a predetermined amount of $CO_2$ specified by, e.g., a regulatory body. Certified Green Goods can enable an end user (e.g., retailer or certificate issuer) to quantify environmental sustainability by tracking e.g., $CO_2$ impact for the TCCS that is used for transporting the goods by analyzing data generated or obtained by the TCCS. The data can include information such as whether the TCCS used electric or diesel power to control temperature, and to what degree each type of power was used, the energy consumption of the TCCS during the trip, the allocation (e.g., percentage) of the energy consumption into the cargo load e.g., by weight, tracking of the cargo load during the trip to make appropriate allocation for partial loads, etc. The embodiment can enable the measurements of environmental impact of the TCCS and enable the linking of the environmental impact of the TCCS to the cargo load. The environmental sustainability data can be disseminated, notarized, shared, or published via a data repository.

In an embodiment, TCCS equipment data can be tracked to facilitate e.g., Equipment Certification. TCCS equipment data can include the conditions of the TCCS, the inspection and maintenance records of the TCCS, any pending alarm (that can invalidate the certificate) in the equipment of the TCCS, etc. The TCCS equipment data can be disseminated, notarized, shared, or published via a data repository. It will be appreciated that Blockchain provides a secure way to make certificates public and can be used to notarize, disseminate, and publish the Equipment Certification. It will be appreciated that Equipment Certification or Equipment Credentials can have hierarchies. For example, TCCS manufactures can issue certification to a dealer, the dealer can issue certification to a TCCS. For example, TCCS manufacturer can certify that certain TCCS dealers are authorized to perform inspections and issue equipment certificates because the dealers meet certain dealer criteria (training, processes, service equipment, etc.). Then the authorized (certified) dealers are able to issue certificates (e.g., this unit has been certified by a certain dealer, who is a certified dealer by the manufacturer) for TCCS units. A certificate can be issued if the requirements of the equipment of the TCCS specified by e.g., the manufacture are satisfied. Digitization of transportation (e.g., digital freight brokerage) can enable the use of the certificates. Published certificates can be presented to prospective buyers of TCCS services, which can be achieved through digital freight brokerage platforms of e.g., digital freight brokers.

In an embodiment, digitally linked acceptance of compliant TCCS equipment to cargo shipment contract requirements can be established for assurance of capability and compliance of TCCS equipment prior to cargo load assignment. Shipper and/or consignor can define a specific capability and characteristics of the TCCS equipment during contract bidding process or, in the case of a private fleet, match a cargo load to TCCS equipment capabilities within the private fleet that conforms to the requirements of the cargo load. The TCCS equipment assignment and performance can remain with the shipment history in detail to assure cargo (e.g., food) safety and that other compliance requirements are met. The embodiment can enable the assessment of the ability of the TCCS equipment to meet e.g., the temperature control requirements for specific cargo loads, and assure that the cargo load is properly matched to the capable TCCS equipment. The embodiment can enable e.g., the shippers to directly select and validate the operational profile controlling the TCCS equipment operation owned by the carrier or contracted operator, to reduce the loss or damage of valuable cargo. The TCCS equipment compliance data can be disseminated, notarized, shared, or published via a data repository. The TCCS equipment compliance data can include the capability data and reliability history of the TCCS system which can be evaluated prior to assignment of a cargo load for transport. Capability or compliance data can include temperature control capability, carbon footprint, fuel or energy consumption, the ability to comply with regulations for noise, emissions limits and zero emissions operations. Capability or compliance data can be stored in the TCCS equipment profile and/or disseminated, notarized, shared, or published via a data repository.

In the embodiment, a direct connection between the shipper and the carrier of the cargo goods can be established with assurance to other users, including the receiver of the goods, that proper temperature control was maintained within the TCCS having temperature control equipment and environmental container/box that had been pre-evaluated prior to the shipment being selected for that specific container and transaction.

It will be appreciated that pre-cooling of the cargo and pre-trip procedures can help determining the immediate capability of the TCCS, information such as the history of the TCCS and risk associated with past reliability, and thermal performance.

The capabilities and reliability history of the TCCS can be evaluated prior to assignment of a cargo load for transport. Capability of the TCCS can include temperature control, overall carbon footprint, fuel/energy consumption, ability to comply with regulations for noise, emissions limits, and zero emissions operations, etc.

Carriers can match the TCCS equipment to the compliance requirements based on the capability of the TCCS, so that liability for carriers can be reduced. The required compliance and capability information of the TCCS can be stored in the TCCS equipment profile and then matched to the shipper requirements electronically and included in a distributed data repository, so that the TCCS equipment profile can be shared across multiple parties/users and can facilitate cargo load bidding and market rate transactions for freight logistics. For example, TCCS equipment used for pharmaceuticals and/or other high value temperature control shipments can be valued for higher freight price rates with higher shipper confidence.

A standard interface regardless of the equipment manufacture or type can be established for the capability data of the TCCS. Once the TCCS equipment profile (or parameters) are saved in the data repository, the TCCS equipment profile can be expanded and/or weighted to facilitate shipper to carrier equipment matchmaking.

In an embodiment, fleet (or TCCS of a fleet) readiness data can be tracked to facilitate the evaluation of the fleet. The fleet readiness data can include fleet readiness score. The fleet readiness score can be quantified (e.g., from 1-5, 1-100, etc., the higher the score, the better the readiness of the fleet or a TCCS of the fleet). The fleet readiness score can help fleet management companies to obtain better insurance rate for the trip based on a higher score. The fleet readiness score can be determined based on e.g., the age of the fleet, service/maintenance history of the fleet, regulatory compliance (e.g., CARB compliance) capability, etc. The fleet readiness score can be based on forward-looking analytics (e.g., information to be provided before start of the trip). The forward-looking analytics data can include e.g., next service due date, the number of miles worth of trip that the fleet is ready for, battery life remaining, a set of outstanding alarms or alerts, $CO_2$ emission based on setpoints (e.g., setpoint temperature for the cargo load), comparison of the fleet with other fleets, etc. The fleet readiness score can also reflect the equipment condition (such as whether the equipment condition can be certified as "good/ready" based on, e.g., maintenance history (well-maintained units or poorly maintained units). A freshness score/data can also be tracked. The freshness score can be quantified (e.g., from 1-5, 1-100, etc., the higher the score, the better the freshness of the cargo load). For example, when the temperature of the cargo load during the transport exceeds a predetermined threshold for a predetermined period of time, the cargo (e.g., food) may spoil faster than expired date mentioned on the container (e.g., the box contains the food), and a reduced freshness score can be issued. It will be appreciated that the freshness score of the cargo goods can facilitate the operational decisions for the receiver of the cargo goods (e.g., which shipments to inspect, how to dispose of shipments, etc.). The fleet readiness data, the freshness score/data, warehouse data, retail store or other building data, etc. can be disseminated, notarized, shared, or published via a data repository.

In an embodiment, the cargo load heat measurement data can be tracked. It will be appreciated that goods (such as produce) generating heat is a natural process of degrading (e.g., rotting). Different cargo load (e.g., produce) types and freshness may generate different levels of heat and the heat measurement data can provide key insight to e.g., the receiver of the cargo load. The controller of the TCCS can determine the heat generated by the cargo load based on, e.g., the external/ambient temperature, the internal temperature of the cargo space, the weight of the cargo load, and the cooling/heat generated from the TCCS. The heat measurement data can be disseminated, notarized, shared, or published via a data repository.

In an embodiment, TCCS quality control performance data (e.g., temperature control performance data) can be tracked to provide end users information about the quality of the transported cargo goods so that end users can make inspection decisions upon receipt. It will be appreciated that the temperature control performance data can be graded (e.g., can be quantified, e.g., from 1-5, 1-100, etc., the higher the number, the better the grade/quality level of the cargo load) temperature control performance data. A grade or rating can provide end users with sufficient information about the quality of the transported goods. The temperature control performance data can include the measured delta of actual temperature versus setpoint of temperature (for the temperature control of the cargo goods) over time. End users can determine at which grade level an inspection of the received cargo goods should be initiated based on the temperature control performance data. End users can also determine whether the TCCS should be brought in for service/maintenance based on the temperature control performance data.

In the embodiment, the quality level of the climate control transport of goods can be represented, in e.g., a grade/score or rating.

With the visibility to the quality level of the climate control transport of goods, users (e.g., receivers of the goods) can direct their inspections to transport cargo loads that are showing indication of needed review. For example, the receivers of the goods can reject the goods based on the quality level of the goods, even before inspecting the goods. The quality level of the goods can be determined, e.g., by a controller, based on the measured delta of actual temperature versus setpoint of temperature over time. For example, in every minute, an average temperature delta from setpoint temperature can be captured/sensed and logged/saved. Over time this log can be analyzed with an accuracy preference inputted by the user. For example, if the user expects a maximum of +/−2 degrees (Fahrenheit) from the setpoint temperature, the calculation of the quality level of goods may take this maximum allowable deviation into account. For example, if a predetermined percentage (e.g., 95%) of the actual temperature readings are less than or equal to a first threshold (e.g., +/−2 degrees Fahrenheit) from the setpoint temperature over the course of the trip, then this trip can get a Grade A rating (quality level) for the goods transported. If a predetermined percentage (e.g., 95%) of the actual temperature readings are greater than the first predetermined threshold (e.g., +/−2 degrees Fahrenheit) but less than or equal to a second predetermined threshold (e.g., +/−4 degrees Fahrenheit) from the setpoint temperature over the trip, a Grade B rating (quality level) can be given to the transported goods, etc. A user (e.g., a receiver of the goods such as a retailer) can determine at which Grade level an inspection should be initiated.

The quality level of the goods can also include high temperature disturbances in determination of the rating. For example, if there is a more than 30 minutes (or other predetermined period of time) that the actual temperature readings are over a third predetermined threshold (e.g., +/−10 degrees Fahrenheit) from the setpoint temperature, a Grade of F can be given to the transported goods, and an alarm can be raised by e.g., the controller so that the TCCS unit can be brought in for service/maintenance.

It will be appreciated that the setpoint temperature can be adjustable, e.g., during pulldown and continuous mode. The setpoint temperature can be tied to a climate control profile and does not have to be steady. It will also be appreciated that temperature delta from setpoint temperature can be used to determine the grade of the goods, other measurements can also be used to determine the grading of temperature control quality (and thus the quality of the goods). The TCCS can create various metrics to summarize the temperature accuracy of refrigeration and impact on condition of the cargo load. The TRU/TCCS controller can obtain high granularity information, including the details of transients to create the metric for the quality/temperature control performance data. The quality/temperature control performance data can be disseminated, notarized, shared, or published via a data repository.

In an embodiment, reporting data can be tracked to facilitate communication between the TCCS and end users (e.g., carriers, receiving customers, etc.) on information about the integrity of the transported cargo load throughout the carrier's possession of the cargo load within the TCCS. The reporting data can help to provide product (e.g., cargo load) integrity and traceability throughout the product supply chain lifecycle, reduce labor cost for product inspection at point of delivery, save cost of insurance for carriers for product being carried, and reduce claims (e.g., product damage claims) for carriers. The reporting data can include TCCS internal/external climate conditions prior to loading of the cargo, TCCS internal/external climate conditions during loading and loading duration, product/cargo (being loaded) temperature via wireless sensors at time of loading, time in TCCS, temperature after loading and the temperature curve, Min/Max/Median temperature of the TCCS and the product throughout the possession with the carrier, product temperature at loading, total time product within acceptable temperature, total time product outside acceptable temperature, etc. The reporting data can be used to determine the impact on product integrity for duration outside the acceptable temperature, and determine load score (e.g., regarding the quality of the cargo load). End users (e.g., receiving customers) can accept or reject the cargo load prior to door opening based on the reporting data. End users (e.g., carriers) can receive a score based on the reporting data. The reporting data can be disseminated, notarized, shared, or published via a data repository.

In an embodiment, thermal properties of TCCS (e.g., characteristics of the space being controlled by the TCCS) can be tracked to help to determine e.g., the trailer insulation system performance, the trailer insulation system degradation as it ages, which trailer may fit a particular profile better than others, decisions about trailer replacement and repair, and/or other TCCS operational decisions. The thermal properties of TCCS can be determined by analyzing e.g., transport refrigeration unit (TRU) data. TRU data can include ambient temperature, setpoints, etc. It will be appreciated that a high sample frequency may be needed to recognize curve shapes of TRU data for pulldowns, door openings, or other dynamic events. Once the TRU data are obtained, the TRU data can be analyzed to determine a standard equation/correlation for thermal properties of a box (e.g., a trailer box). The standard equation can be applied to a large number of boxes to determine parameter characteristics, and a benchmark can be created. The benchmark can be applied to fleets in order to make operational decisions on the fleet. The thermal properties of TCCS can be disseminated, notarized, shared, or published via a data repository.

In the embodiment, data collected (e.g., sensed data, etc.) from the TCCS can be analyzed to determine the trailer performance or the thermal properties of the trailer. For example, a score/scale/metric of the trailer performance can be determined based on e.g., the setpoints vs actual measurement values. It will be appreciated that insulation tests (requiring special test setup) can be performed to determine the trailer performance or the thermal properties of the trailer.

Data analysis for determining thermal properties of trailers can include analyzing a trailer against itself over time to model degradation, comparing trailer to trailer with the same CCU unit, baselining and benchmarking of the trailer performance, comparing trailer to trailer with different CCU units, etc. Data analysis can include box (e.g., trailer, truck, container, domestic rail container, APU to cab, rail cars, bus, etc.) equation, basic/baseline box model, benchmark and scoring output, customer input of trailer information, etc.

When the thermal properties of trailers (e.g., Trailer Performance Scale) are determined, customer report can be generated by e.g., the controller of the TCCS. The TPS data can be combined with other trailer info (e.g., length, height, door number, series number, etc.) for a particular TCCS.

The thermal properties of trailers can facilitate the use of specific trailers for specific applications, which can in turn extend trailer lifetime and increase effectiveness of each trailer. The thermal properties of trailers can associate the trailer value retention with a score.

In an embodiment, sensor data can be tracked to provide early visibility into the condition of the cargo. TCCS or the TRU of the TCCS can act as proxy for the transmission of data from sensors embedded in the cargo. It will be appreciated that the telematics capabilities of a TRU can be used to transmit data not only from sensors attached to the TRU or trailer, but also from sensors that cargo shippers often embed into the cargo itself. It will also be appreciated that shippers of sensitive cargo often embed sensors into the cargo itself in order to monitor the condition of the cargo. Such sensors include temperature sensor, humidity sensor, location sensor, etc. The corresponding variables are typically measured periodically and the measurement data are logged/saved on the sensors (e.g., memory of the sensor devices). The data are typically retrieved upon arrival of the cargo at the destination. TCCS (or the TRU of the TCCS) acting as proxy for the transmission of sensors data can provide early detection of potential problems and early intervention to mitigate the effects. Early transmission of the sensors data (e.g., while the cargo is still in transit) can enable early detection and intervention, e.g., rearrangement of cargo to enable proper air flow, repairing of the TRU, adjustment of potentially incorrect settings, early ordering of another shipment if the cargo is already unusable, early determination of dispatch at the destination, etc.

In the embodiment, the TRU/TCCS can act as a proxy to achieve early transmission of logging data (e.g., sensor data), e.g., while the TRU/TCCS is in transit. It will be appreciated that the supplier of the logging apparatus (sensor loggers or the like) can provide a long-range radio (e.g., cellular) to the logging apparatus (e.g., cellular-enabled sensor loggers).

It will also be appreciated that the TRU/TCCS's telematics can be used to act as a gateway for the sensor loggers embedded in the cargo. The sensor loggers can connect to the telematics (e.g., via a short-range wireless radio, or a wired connection). The telematics system can forward the sensor data to e.g., a cloud or a data repository such as Blockchain, etc. Users (e.g., cargo recipient) can retrieve the sensor data as soon as they are available rather than wait until the shipment arrives the destination. The forwarded sensor data can include not only the sensor logger data collected/sensed during the transportation in the TRU (in almost real-time), but also data collected during previous stages of the transportation, to enable better and faster decision making. Furthermore, a comparison of data from the TRU and from the cargo-enabled sensor logger can enable earlier detection of discrepancies between the two data sources. The sensor logger embedded inside the cargo can digitally sign the sensor data, so that the fact that the sensor data is transmitted through an intermediary/proxy (e.g., the telematics device) does not cause invalidity of the sensor data. The sensor data can be disseminated, notarized, shared, or published via a data repository.

In an embodiment, climate control profile (e.g., preferences, parameters) data specified by end users can be automatically enforced by the TCCS (e.g., climate control unit CCU and/or TRU of the TCCS). Climate control profile can include information such as the desired temperature at the beginning of the transportation, during the transportation, and at the end of the transportation; vibration control of the goods (e.g., how bumpy the trip can be); etc. Typically end users may not have direct visibility to the transportation equipment. Refrigeration parameters and settings can vary with the type of the cargo load (e.g., product) and with the particular end user; different end users may have different preferences for the conditions under which a particular type of product needs to be transported. It will be appreciated that technologies like Blockchain enable the secure digitization of the paper trail associated with the supply chain of goods, even when that supply chain cuts across the boundaries of multiple companies. It will also be appreciated that bills of lading are becoming increasingly electronic. The bill of lading can be used to associate a transportation instance ("shipment") with other information related to the load of the shipment and collected across the entire supply chain. The climate control profile desired by the user who wants to specify the profile can be digitally attached to a digital contract (e.g., stored on data repository) and eventually become part of a digital bill of lading (e.g., stored on data repository). End users can specify the "how" (refrigeration/operating profile) of the TCCS operation, and the data collected via TCCS is analyzed to create a metric (e.g., cargo goods freshness metric) to help to validate/confirm the specified operation. The controller of the TCCS can retrieve the climate control profile from the bill of lading (or other document that can be used to associate the transport function with the cargo load) and enforce the climate control profile (e.g., setup the parameters). It will be appreciated that the controller of the TCCS can also retrieve the climate control profile from any other suitable source(s), as long as the climate control profile is associated with the shipment (e.g., indexed with the bill of lading number or similar identifying data). Upon completion of the transport, the controller can inject back into the data repository a certificate showing compliance of the actual parameter settings with the specified climate control profile and compliance of the outcome (e.g., temperature graph or other metric showing adherence to setpoints and deviations from setpoints) with expected/predetermined outcome.

In the embodiment, the climate control profile (e.g., preferences for the refrigeration settings) can be selected by the carrier, recommended by the TCCS equipment manufacturer, or the user (owner of the goods, recipient of the goods, etc.) designates a particular climate control profile of settings to be used by the carrier. In some embodiments, compliance can be verified by the user, by e.g., analyzing the transportation logs, monitoring the condition of the arriving goods, etc. The carriers can be selected by a different party than the party that is affected by the quality of the received goods (e.g., the carrier may be chosen by the shipper instead of the receiver of the goods). Embodiment disclosed herein can help reduce deviations from the desired climate control profile caused by e.g., human error or machine malfunction. Climate control profile or preferences can be specified by a customer (e.g., recipient of the goods) that may have no direct visibility to the transportation equipment. These refrigeration preferences can be read from the data repository and enforced by the TCCS equipment, and the compliance with the customer's preferences can be certified in a way visible to the customer.

Embodiment disclosed herein can enable the desirable temperature settings to "follow" the cargo load through the digital trail (e.g., created on the data repository such as Blockchain or a shared database with digital trail feature). Temperature compliance certificate can be made available at end of trip (e.g., by the controller of the TCCS). The storage of the communicated refrigeration preference can be transmitted to a shared ledger, ensuring that the refrigeration preferences are received and implemented by the target device (e.g., the TCCS). The climate control profile (preferences) and certificate can be disseminated, notarized, shared, or published via a data repository. It will be appreciated that once the climate control profile is published by a user (owner of the goods), another user (e.g., a carrier) that is responsible for transporting goods for the owner can retrieve the published climate control profile and configure the carrier's TCCS based on the retrieved climate control profile. It will also be appreciated that the climate control profile can include capability requirements for a TCCS, and the carrier can select the TCCS that has the capability from its fleet to satisfy the capability requirements.

In an embodiment, price differentiation based on climate control profiles can be determined to help end users (e.g., carriers of refrigerated loads) to price shipments more accurately, thus creating a more efficient market. It will be appreciated that climate control profile (including carrier refrigeration parameters) configuration can have a significant impact on the cost of refrigerated transport. For example, TCCS operating in continuous mode may provide higher temperature accuracy, but may also consume more fuel or energy. In contrast, TCCS operating in cycle sentry (start-stop) mode may conserve fuel or energy but may reduce temperature accuracy. End users such as cargo owners may have preferences for climate control profile (e.g., preferred refrigeration parameters/configurations for TCCS), and price differentiation based on climate control profiles can take the economic impact of these preferences into account when pricing the shipment of loads in advance. Data analytics models, artificial intelligence/machine learning, etc., can help to incorporate knowledge of the TCCS operation, along with e.g., digital freight brokerage platforms. For example, the pricing optimization may include the estimation of refrigeration costs based on the selected options—e.g. a cargo load requiring A degrees temperature control transported B miles under C thermal conditions requires D % additional energy, compared to a relaxed temperature requirement of A+/−Δe.

In the embodiment, algorithms and artificial intelligence can be used to estimate the cost of refrigerated transport goods upfront and price of the transport services. It will be appreciated that average pricing can be applied to all cargo loads. The algorithm can take into account a customer's specified temperature profile/temperature accuracy (along with other parameters like the type of the cargo load (e.g., pharmaceuticals, produce, frozen food, etc.), ambient temperature, insulation of a trailer, etc.) and provide estimate of the operational cost of transported goods. The results of the algorithm can help users (e.g., carriers, brokers, etc.) to price cargo loads and/or transport services more accurately. The algorithm can use various techniques such as data analytics models, artificial intelligence/machine learning, etc. to conduct the estimation. The algorithms can also incorporate knowledge of the TRU/TCCS's operation. The deployment of such capabilities may be implemented with the use of digital freight brokerage platforms, which are deployed by digital freight brokers. Digital freight brokerage platforms can enable bid-ask interactions between shippers and carriers. The algorithm can generate data to help the users such as the transport company or the receiver of the goods with pricing, and the price differentiation can be based on e.g., transport refrigeration preferences. The climate control profile data can be disseminated, notarized, shared, or published via a data repository.

In an embodiment, a freshness score/data can be tracked to assist end users (carriers, cargo receivers, etc.) in improving the freshness score of transported goods. The freshness score can be quantified (e.g., from 1-5, 1-100, etc., the higher the score, the better the freshness of the cargo load). It will be appreciated that freshness scores can reflect the condition of refrigerated/transported goods. End users may specify a desirable freshness score, and the embodiment disclosed herein can achieve or improve the freshness score while minimizing operational costs. After the end users specify the desirable value of the freshness score/metric, the appropriate refrigeration/operating profile (that will achieve the freshness score) can be derived from the freshness score. A control algorithm can be used to determine the operating parameters/configuration of a TCCS in order to achieve a particular freshness score. The control algorithm can use the TCCS operation data as well as data such as cargo load, ambient conditions, the insulation of the particular TCCS, etc., and make a recommendation on the climate control profile setting that can minimize cost while meeting the freshness target. The control algorithm can provide cost-effective way to achieve the desirable freshness score. Embodiment disclosed herein can help end customers to get the freshness they specified, and help carriers to economize on operational costs and to achieve operational efficiency.

It will be appreciated that the customer can specify the desirable result (e.g., the freshness score) and the control algorithm can determine the appropriate settings for the TCCS. It will also be appreciated that for any given freshness score, the sensitivity of the freshness score can be used to evaluate what inputs can be adjusted to modify that freshness score. For example, the parameters/data that are used to determine the freshness score can be used as inputs to the user (e.g., a carrier) so that the user can adjust the parameters (e.g., use a tight temperature control for goods such as pharmaceuticals) to achieve a better freshness score while minimizing the cost of transport (e.g., energy, carbon footprint, etc.). The freshness score data can be disseminated, notarized, shared, or published via a data repository.

Figure 6:
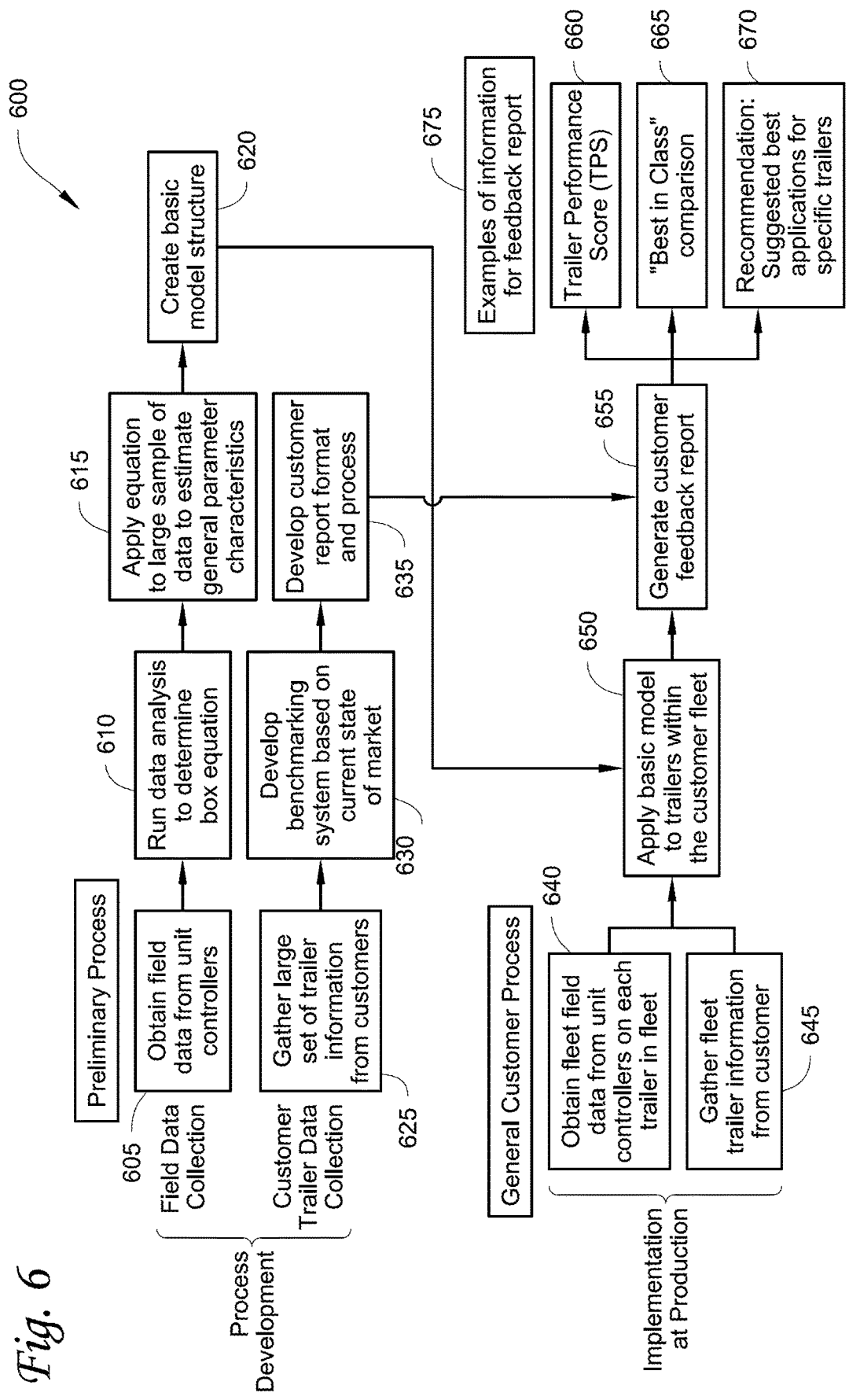
FIG. 6 is a flow chart illustrating a method for determining thermal properties of a box (e.g., trailer box, truck box, or the like), according to one embodiment.

FIG. 6 is a flow chart illustrating a method 600 for determining thermal properties of a box (e.g., trailer box, truck box, or the like), according to one embodiment.

In an embodiment, the TCCS can provide climate control to an internal space of a trailer box. In some embodiments, the TCCS can provide climate control to an internal space of a box such as of a truck, container, rail car, bus, or the like. The field data of the refrigeration unit of the TCCS can be obtained and analyzed to determine the thermal properties of the box (e.g., trailer box, truck box, or the like). The information about the thermal properties can then be used operationally to determine e.g., which trailer may fit a particular profile better than other trailers, to determine e.g., trailer replacement and repair, and to make other operational decisions.

It will be appreciated that currently there is no convenient way to track and determine e.g., the trailer insulation system performance and degradation as the trailer ages. Embodiments disclosed herein can utilize the data that has being collected from the refrigeration units to generate information to determine e.g., the trailer performance.

The method 600 may include one or more operations, actions, or functions depicted by one or more blocks 605-675. Although illustrated as discrete blocks, various blocks may be divided into additional blocks, combined into fewer blocks, or eliminated, depending on the desired implementation. As a non-limiting example, the method 600 can be performed by any suitable controller in one or more embodiments described herein.

In an embodiment, the method 600 begins at 605. At 605, a controller (or any suitable processor(s)) can obtain field data from refrigeration unit controller(s) of one or more TCCS, via e.g., telematics of the one or more TCCS. The field data can include one or more of ambient temperature, setpoint, ambient humidity, box (e.g., trailer box, truck box, or the like) temperature, box humidity, coil (e.g., condenser coil, evaporator coil, or the like) temperature, operational mode, prime mover (e.g., electrical power, combustion engine, vehicle engine, or the like) speed, current and/or voltage of the electronic systems, energy/power to the box, heat transfer characteristics (estimated or determined by a set of parameters), capacity (estimated or determined by a set of parameters), or any other suitable parameters/data the refrigeration unit controller(s) can obtain (e.g., from one or more sensors, or the like). It will be appreciated that the field data can be time series data (e.g., data associated with timestamp(s) recording the time when the data is sensed and/or obtained). The method proceeds to 610.

At 610, the controller (or any suitable processor(s)) can analyze the obtained field data to estimate thermal characteristics of a box attached to a specific refrigeration unit (e.g., trailer box, truck box, or the like). It will be appreciated that thermal characteristics can characterize the heat transfer properties of the box (e.g., trailer box, truck box, or the like), being derived from the obtained field data. In an embodiment, the analysis can include heat loss analysis or the like for the box. In an embodiment, estimating the thermal characteristics can include box (e.g., trailer box, truck box, or the like) thermal equation(s). In an embodiment, a set of the obtained field data may be used to estimate thermal characteristics of the box. The method proceeds to 615.

At 615, the controller (or any suitable processor(s)) can apply the estimated thermal model structure of the box (e.g., trailer box, truck box, or the like) to a large sample of data (e.g., field data obtained from other boxes, field data obtained from boxes operated under different set of conditions, or the like) to determine thermal model coefficients (including general parameter characteristics and degradation, or the like) of the box. It will be appreciated that there can be variabilities regarding the estimated thermal model structure of the box, depending on the load, setpoint for different cargo, temperature pulldowns (recovering box temperature to protect temperature sensitive loads after e.g., door openings), different number of door openings, etc. 615 is designed to take the variabilities into consideration for the thermal analysis at 610. As such, the determined thermal model coefficients of the box and/or the TCCS (e.g., a refrigeration unit and box pair) can include data indicating e.g., how quick the refrigeration unit can pull up the temperature giving the input conditions, how good the thermal characteristics of each box are based on the incoming field data, the variability for a single refrigeration unit assessment by comparing with other refrigeration unit under the same or similar conditions (e.g., a same temperature setpoint or the like). Such comparison can be the box (e.g., trailer box, truck box, or the like) versus itself over time, a pairing of refrigeration unit and box versus a pairing of different refrigeration unit and different box, a pair of refrigeration unit and box versus a pair of same refrigeration unit and different box, or the like. The method proceeds to 620.

At 620, the controller (or any suitable processor(s)) can determine a model structure and/or algorithm for the thermal properties of the box. The model structure is to be used at 650. In an embodiment, the model structure includes parameters that are most important or reflective regarding the thermal properties of the box.

In an embodiment, the method 600 can begin at 625. It will be appreciated that 605 and 625 can perform in any suitable order or concurrently. At 625, the controller (or any suitable processor(s)) can obtain a set of box (e.g., trailer box, truck box, or the like) data from a user (e.g., fleet management system(s), fleet data center, or the like). The box data can include box ID, box length, box height, door numbers of the box, box age, box manufacturer, box VIN numbers, leasing info including leasing agent, purchasing info, or the like. The method proceeds to 630.

At 630, a processor can determine a benchmarking system based on, e.g., users' requirements, market's requirements, regulatory requirements, etc. In an embodiment, determining the benchmarking system can include creating a standard scale and/or metric such as Trailer Performance Score (TPS), other suitable scoring system, or the like; defining an "average in class" curve, a "best in class" curve, or the like defined by e.g., box age, box thermal properties, or the like; and defining applications for boxes with certain thermal properties. The method proceeds to 635.

At 635, a processor can determine a feedback report format and process based on the benchmark determined at 630. The report format and process is to be used in 655.

It will be appreciated that 605-635 are processes for developing the model structure and the benchmark/scoring system/matrix.

In an embodiment, the method 600 begins at 640 or 645. Similar to 605, at 640, the processor can obtain field data from refrigeration unit controller(s) of one or more TCCS of a fleet, via e.g., telematics of the one or more TCCS. The method proceeds to 650.

Similar to 625, at 645, a processor can obtain a set of box (e.g., trailer box, truck box, or the like) data of a fleet from a user (e.g., fleet management system(s), fleet data center, or the like). The method proceeds to 650.

At 650, a processor can apply the model structure determined at 620 to boxes (e.g., trailer box, truck box, or the like) within the fleet using data obtained from 640 and 645. As such, thermal properties of each box within the fleet can be determined relative to thermal properties of other boxes. The method proceeds to 655.

At 655, a processor can generate feedback report(s) based on the thermal properties of each box determined at 650 and the report format and process determined at 635. The generated report(s) can include information for feedback report 675, which includes 660, 665, 670, or the like.

At 660, a scoring output can be shown in the feedback report. In embodiment, the scoring output can include Trailer Performance Score (TPS) or the like to rank the boxes. See also FIG. 7. In an embodiment, each box (e.g., trailer box, truck box, or the like) in the fleet can have a TPS. The TPS can range from 0 to 100 (the higher, the better). The TPS can indicate e.g., how well the box is able to maintain temperature control, how good the insulation system of the box is, how good the thermal properties of the box are, or the like. It will be appreciated that the TPS can be represented by any other suitable means, instead of the numbers (0-100). Each box can have its own ID, age (in years, calculated from manufacturing), or the like associated with the TPS.

At 665, a comparison between one box (e.g., trailer box, truck box, or the like) to the rest of the boxes in the fleet can be shown in the feedback report. In an embodiment, the comparison can be a "Best in Class" comparison, an "Average in Class" comparison, or the like. The comparison method can include comparison within a customer's fleet or across multiple fleets. It will be appreciated that a class can be a grouping or subset of boxes in the fleet. For example, one class can be all boxes associated with a particular refrigeration unit model. In another example, one class can be boxes having a particular model. In yet another example, one class can be boxes from a particular dealer. A "Best in Class" TPS can be determined, and the TPS of a particular box can be compared with the "Best in Class" TPS to show e.g., how many TPS points the particular box is under or above the "Best in Class" TPS. Similarly, an "Average in Class" TPS can be determined, and the TPS of a particular box can be compared with the "Average in Class" TPS to show e.g., how many TPS points the particular box is under or above the "Average in Class" TPS. See also FIG. 7.

At 670, recommendations for each box (e.g., trailer box, truck box, or the like) can be shown in the feedback report. In an embodiment, the recommendations can include suggested best applications for the specific box. For example, the suggested application can be "reserve for critical loads" (that need a tight temperature control) or the like if the TPS of the box is greater than a first threshold. The suggested application can be "general fleet operation" or the like if the TPS of the box is no greater than a first threshold but greater than a second threshold. The suggested application can be "reserve for non-critical loads" (where a loose temperature control is enough) or the like if the TPS of the box is no greater than the second threshold but greater than a third threshold. The suggested application can be "maintenance, non-critical loads" or the like if the TPS of the box is no greater than the third threshold or the box meets the maintenance requirements.

FIG. 7 illustrates an example of box (e.g., trailer box, truck box, or the like) performance scores 700 of a fleet in a box performance report, according to one embodiment. The horizontal coordinate 720 indicates the ID of each box (e.g., trailer box, truck box, or the like) in the fleet. The vertical coordinate 710 indicates the TPS 750 of each box in the fleet. 730 shows the "Average in Class" TPS for a class in the fleet. 740 shows the "Best in Class" TPS for the class in the fleet.

In an embodiment, the feedback report (e.g., the box performance report) can include the box performance scores 700 of the fleet and the feedback report 675 (which includes 660, 665, and 670). The feedback report can also include fleet average performance score, fleet average performance grade (based on the fleet average performance score and thresholds indicating grades/levels, etc.), Best in Class comparison for the fleet, Average in Class comparison for the fleet, or the like, based on e.g., the TPS of each box in the fleet. The feedback report can further include e.g., tables indicating best performing boxes (e.g., trailer box, truck box, or the like) in the fleet, worst performing boxes in the fleet, or the like. The best performing boxes in the fleet and/or the worst performing boxes in the fleet can be determined, e.g., based on the TPS of each box in the fleet. Each box in the table(s) can include the box ID, the TPS for the box, the age (e.g., in years) of the box, the recommendations for the box, or the like.

In an embodiment, the thermal properties of the box can be characterized or determined independent to the refrigeration unit the box is paired with. In another embodiment, the thermal properties of the box can be characterized or determined in combination of the performance or characteristics (e.g., model, compressor speed, cooling input, etc.) of the refrigeration unit the box is paired with.

Embodiments disclosed herein can allow use of specific boxes (e.g., trailer box, truck box, or the like) for specific applications, which can result in extended box lifetime and increased fleet effectiveness. Embodiments disclosed herein can also provide environmental impact and energy use estimations based on the thermal properties such as the TPS, along with fleet operating data to achieve e.g., a "greening of the fleets" type of process. It will be appreciated that adding energy use to the TPS can help with fleets that need to justify new equipment based on e.g., return on investment, tracking/predicting excessive energy use, or the like. The TPS of the boxes can also be used to e.g., predict or determine the environmental impact (e.g., $CO_2$ foot print or the like), by e.g., predicting or determining how much energy is needed in temperature control for each box.

Embodiments disclosed herein can provide recommendations in the fleet feedback report, and implementing the recommendations can result in increased fleet effectiveness and box lifetime. The fleet data can be obtained without needing expensive test setup. The feedback report can also make the fleet more attractive with e.g., certified high performing boxes that can differentiate the fleet from others. The fleet can market their boxes as separate offerings, based on the feedback report which can be used to certify (the condition, performance, etc. of) the boxes/fleet to ensure cargo quality. For example, top performing boxes can be selected for more critical loads such as pharmaceuticals, and boxes with lower performance can be used for loads that do not require rigid temperature control. As such, for a fleet mixed with boxes having different quantities of thermal properties, the fleet management can prioritize those boxes with best performance to the most temperature critical applications.

Embodiments disclosed herein can provide dealers an option to offer a professional service to manage a fleet based on the thermal properties of the boxes, including e.g., coaching customers on the performance of their boxes, or the like.

ASPECTS

It is to be appreciated that any of aspects 1-10, any of aspects 11-20, any of aspects 21-26, any of aspects 27-31, any of aspects 32-38, and any of aspects 39-45 can be combined with each other.

Aspect 1. A method for conveying data from a transport climate control system (TCCS) that provides climate control within an internal space moved by a vehicle, the method comprising:
  determining, by a controller of the TCCS, a set of TCCS operational measurements;
  obtaining, by the controller, a set of TCCS operational settings;
  determining, by the controller, a set of cargo measurements;
  creating a shipment performance log based on the set of TCCS operational measurements, the set of TCCS operational settings, and the set of cargo measurements;
  publishing the shipment performance log to a data repository; and
  retrieving the shipment performance log to facilitate disposition of goods in the internal space.

Aspect 2. The method according to aspect 1, further comprising:
  obtaining, by a plurality of TCCS sensors, the set of TCCS operational measurements; and
  communicating the set of TCCS operational measurements to the controller;
  wherein the set of TCCS operational measurements includes one or more of an ambient temperature outside of the internal space, an ambient humidity outside of the internal space, a compressor suction pressure, a compressor discharge pressure, a supply air temperature of air supplied into the internal space, a return air temperature of air returned from the internal space, and a humidity within the internal space.

Aspect 3. The method according to aspect 1 or aspect 2, wherein the set of TCCS operational measurements includes pre-loading operational measurements, operational measurements in transit, and operational measurements upon arrival of destination.

Aspect 4. The method according to any one of aspects 1-3, wherein the set of TCCS operational settings includes one or more of a tight temperature control configuration, a loose temperature control configuration, a setpoint temperature, a continuous airflow configuration, and a start-stop airflow configuration.

Aspect 5. The method according to aspect 4, wherein the tight temperature control configuration is for controlling a deviation of an actual temperature in the internal space from the setpoint temperature, the deviation being less than or equal to a first predetermined threshold.

Aspect 6. The method according to aspect 4, wherein the loose temperature control configuration is for controlling a deviation of an actual temperature in the internal space from the setpoint temperature, the deviation being greater than a first predetermined threshold but less than or equal to a second predetermined threshold.

Aspect 7. The method according to any one of aspects 1-6, wherein the set of cargo measurements includes one or more of a weight of goods in the internal space, a type of goods in the internal space, a temperature measurement in the internal space, a humidity measurement in the internal space, and a vibration measurement in the internal space.

Aspect 8. The method according to any one of aspects 1-7, wherein the shipment performance log includes one or more of temperature controlled by the TCCS, an insulation performance of the TCCS, and a certification of the goods.

Aspect 9. The method according to any one of aspects 1-8, wherein disposition of goods includes one or more of accepting the goods, inspecting the goods, rejecting the goods, and intervening to save the goods.

Aspect 10. The method according to any one of aspects 1-9, wherein the data repository is Blockchain, publishing the shipment performance log includes disseminating, notarizing, and sharing the shipment performance log via the data repository.

Aspect 11. A transport climate control system (TCCS) that provides climate control within an internal space moved by a vehicle, the TCCS comprising:
- a refrigeration circuit including a compressor, a condenser, an expansion device, and an evaporator; and
- a controller configured to control operation of the refrigeration circuit,
- wherein the controller is configured to:
  - determine a set of TCCS operational measurements;
  - obtain a set of TCCS operational settings;
  - determine a set of cargo measurements;
  - create a shipment performance log based on the set of TCCS operational measurements, the set of TCCS operational settings, and the set of cargo measurements; and
  - publish the shipment performance log to a data repository.

Aspect 12. The TCCS according to aspect 11, further comprising:
- a plurality of TCCS sensors configured to obtain the set of TCCS operational measurements, the plurality of TCCS sensors communicates the set of TCCS operational measurements to the controller;
- wherein the set of TCCS operational measurements includes one or more of an ambient temperature outside of the internal space, an ambient humidity outside of the internal space, a compressor suction pressure, a compressor discharge pressure, a supply air temperature of air supplied into the internal space, a return air temperature of air returned from the internal space, and a humidity within the internal space.

Aspect 13. The TCCS according to aspect 11 or aspect 12, wherein the set of TCCS operational measurements includes pre-loading operational measurements, operational measurements in transit, and operational measurements upon arrival of destination.

Aspect 14. The TCCS according to any one of aspects 11-13, wherein the set of TCCS operational settings includes one or more of a tight temperature control configuration, a loose temperature control configuration, a setpoint temperature, a continuous airflow configuration, and a start-stop airflow configuration.

Aspect 15. The TCCS according to aspect 14, wherein the tight temperature control configuration is for controlling a deviation of an actual temperature in the internal space from the setpoint temperature, the deviation being less than or equal to a first predetermined threshold.

Aspect 16. The TCCS according to aspect 14, wherein the loose temperature control configuration is for controlling a deviation of an actual temperature in the internal space from the setpoint temperature, the deviation being greater than a first predetermined threshold but less than or equal to a second predetermined threshold.

Aspect 17. The TCCS according to any one of aspects 11-16, wherein the set of cargo measurements includes one or more of a weight of goods in the internal space, a type of goods in the internal space, a temperature measurement in the internal space, a humidity measurement in the internal space, and a vibration measurement in the internal space.

Aspect 18. The TCCS according to any one of aspects 11-17, wherein the shipment performance log includes one or more of temperature controlled by the TCCS, an insulation performance of the TCCS, and a certification of the goods.

Aspect 19. The TCCS according to any one of aspects 11-18, further comprising a set of sensors embedded in the goods, the set of sensors is configured to obtain the set of cargo measurements.

Aspect 20. The TCCS according to any one of aspects 11-19, wherein the data repository is Blockchain, publishing the shipment performance log includes disseminating, notarizing, and sharing the shipment performance log via the data repository.

Aspect 21. A method for conveying data from a transport climate control system (TCCS) that provides climate control within an internal space moved by a vehicle, the method comprising:
- obtaining a set of TCCS capability data;
- obtaining a set of TCCS reliability data;
- determining a TCCS performance log based on the set of TCCS capability data and the set of TCCS reliability data;
- publishing the TCCS performance log to a data repository; and
- retrieving the TCCS performance log to facilitate a selection decision of the TCCS.

Aspect 22. The method according to aspect 21, further comprising:
obtaining a set of cargo requirements;
determining whether the set of cargo requirements is satisfied by the TCCS performance log, and
issuing a certification to the TCCS if the set of cargo requirements is satisfied,
wherein the set of TCCS capability data includes one or more of a temperature control capability, a carbon footprint, an energy consumption, a compliance with regulations for noise, a compliance with emissions limits, and a compliance with zero emissions operations.

Aspect 23. The method according to aspect 21 or aspect 22, wherein the set of TCCS reliability data includes one or more of an inspection record, a maintenance records, and a usage record.

Aspect 24. The method according to any one of aspects 21-23, wherein the set of TCCS capability data is determined based on a set of forward-looking analytics data, the set of forward-looking analytics data includes one or more of next service due date, a number of miles worth of trip that the TCCS is ready for, a battery life remaining, a set of outstanding alarms or alerts, and $CO_2$ emission based on setpoints temperature.

Aspect 25. The method according to any one of aspects 21-24, wherein the selection decision of the TCCS includes assigning a cargo load to the TCCS for transport.

Aspect 26. The method according to any one of aspects 21-25, wherein the data repository is Blockchain, publishing the TCCS performance log includes disseminating, notarizing, and sharing the TCCS performance log via the data repository.

Aspect 27. A transport climate control system (TCCS) that provides climate control within an internal space moved by a vehicle, the TCCS comprising:
a refrigeration circuit including a compressor, a condenser, an expansion device, and an evaporator; and
a controller configured to control operation of the refrigeration circuit,
wherein the controller is configured to:
determine a TCCS performance log based on a set of TCCS capability data and a set of TCCS reliability data; and
publish the TCCS performance log to a data repository.

Aspect 28. The TCCS according to aspect 27, wherein the set of TCCS capability data includes one or more of a temperature control capability, a carbon footprint, an energy consumption, a compliance with regulations for noise, a compliance with emissions limits, and a compliance with zero emissions operations.

Aspect 29. The TCCS according to aspect 27 or aspect 28, wherein the set of TCCS reliability data includes one or more of an inspection record, a maintenance records, and a usage record.

Aspect 30. The TCCS according to any one of aspects 27-29, wherein the set of TCCS capability data is determined based on a set of forward-looking analytics data, the set of forward-looking analytics data includes one or more of next service due date, a number of miles worth of trip that the TCCS is ready for, a battery life remaining, a set of outstanding alarms or alerts, and $CO_2$ emission based on setpoints temperature.

Aspect 31. The TCCS according to any one of aspects 27-30, wherein the data repository is Blockchain, publishing the TCCS performance log includes disseminating, notarizing, and sharing the TCCS performance log via the data repository.

Aspect 32. A method for specifying and configuring a climate control profile for a transport climate control system (TCCS) that provides climate control within an internal space moved by a vehicle, the method comprising:
publishing a climate control profile to a data repository;
retrieving the climate control profile from the data repository;
configuring, by a controller of the TCCS, the TCCS with a set of configurations that corresponds to the climate control profile, and
operating the TCCS with the set of configurations.

Aspect 33. The method according to aspect 32, further comprising:
certifying, by the controller, compliance with the climate control profile upon arrival of a destination; and
publishing, by the controller, a certificate of compliance to the data repository.

Aspect 34. The method according to aspect 32 or aspect 33, wherein the climate control profile incudes one or more of a desired temperature before transport, a desired temperature in transit, a desired temperature upon arrival of a destination, and a desired vibration control.

Aspect 35. The method according to any one of aspects 32-34, wherein the set of configurations includes one or more of a tight temperature control configuration, a loose temperature control configuration, a setpoint temperature, a continuous airflow configuration, and a start-stop airflow configuration.

Aspect 36. The method according to aspect 35, wherein the tight temperature control configuration is for controlling a deviation of an actual temperature in the internal space from the setpoint temperature, the deviation being less than or equal to a first predetermined threshold.

Aspect 37. The method according to aspect 35, wherein the loose temperature control configuration is for controlling a deviation of an actual temperature in the internal space from the setpoint temperature, the deviation being greater than a first predetermined threshold but less than or equal to a second predetermined threshold.

Aspect 38. The method according to any one of aspects 32-37, wherein the data repository is Blockchain, publishing the TCCS performance log includes disseminating, notarizing, and sharing the TCCS performance log via the data repository.

Aspect 39. A transport climate control system (TCCS) that provides climate control within an internal space moved by a vehicle, the TCCS comprising:
a refrigeration circuit including a compressor, a condenser, an expansion device, and an evaporator; and
a controller configured to control operation of the refrigeration circuit,
wherein the controller is configured to:
retrieve a climate control profile from a data repository;
configure the TCCS with a set of configurations that corresponds to the climate control profile, and
control the TCCS with the set of configurations.

Aspect 40. The TCCS according to aspect 39, wherein the controller is further configured to:
certify compliance with the climate control profile upon arrival of a destination; and
publish a certificate of compliance to the data repository.

Aspect 41. The TCCS according to aspect 39 or aspect 40, wherein the climate control profile incudes one or more of a desired temperature before transport, a desired temperature in transit, a desired temperature upon arrival of a destination, and a desired vibration control.

Aspect 42. The TCCS according to any one of aspects 39-41, wherein the set of configurations includes one or more of a tight temperature control configuration, a loose temperature control configuration, a setpoint temperature, a continuous airflow configuration, and a start-stop airflow configuration.

Aspect 43. The TCCS according to aspect 42, wherein the tight temperature control configuration is for controlling a deviation of an actual temperature in the internal space from the setpoint temperature, the deviation being less than or equal to a first predetermined threshold.

Aspect 44. The TCCS according to aspect 42, wherein the loose temperature control configuration is for controlling a deviation of an actual temperature in the internal space from the setpoint temperature, the deviation being greater than a first predetermined threshold but less than or equal to a second predetermined threshold.

Aspect 45. The TCCS according to any one of aspects 39-44, wherein the data repository is Blockchain, publishing the TCCS performance log includes disseminating, notarizing, and sharing the TCCS performance log via the data repository.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for conveying data from a transport climate control system (TCCS) that provides climate control within an internal space moved by a vehicle, the method comprising:
    determining, by a controller, a set of TCCS operational measurements;
    obtaining, by the controller, a set of TCCS operational settings, the set of TCCS operational settings including one or more of a tight temperature control configuration, a loose temperature control configuration, a setpoint temperature, a continuous airflow configuration, and a start-stop airflow configuration;
    determining, by the controller, a set of cargo measurements;
    tracking a freshness score to reflect a condition of goods in the internal space based on sensor data sensed by at least one sensor;
    determining the set of TCCS operational settings to achieve a freshness target based on the freshness score;
    controlling the TCCS with the set of TCCS operational settings;
    creating a shipment performance log based on the set of TCCS operational measurements, the set of TCCS operational settings, and the set of cargo measurements;
    publishing the shipment performance log to a data repository;
    retrieving the shipment performance log; and
    facilitating disposition of goods in the internal space based on the retrieved shipment performance log, disposition of goods including one or more of accepting the goods, inspecting the goods, rejecting the goods, and intervening to save the goods based on the shipment performance log,
    wherein the data repository is Blockchain, publishing the shipment performance log includes disseminating, notarizing, and sharing the shipment performance log via the data repository,
    wherein publishing the shipment performance log to the data repository is performed via telematics of the TCCS.

2. The method according to claim 1, further comprising:
    obtaining, by a plurality of TCCS sensors, the set of TCCS operational measurements; and
    communicating the set of TCCS operational measurements to the controller;
    wherein the set of TCCS operational measurements includes one or more of an ambient temperature outside of the internal space, an ambient humidity outside of the internal space, a compressor suction pressure, a compressor discharge pressure, a supply air temperature of air supplied into the internal space, a return air temperature of air returned from the internal space, and a humidity within the internal space.

3. The method according to claim 1, wherein the set of TCCS operational measurements includes pre-loading operational measurements, operational measurements in transit, and operational measurements upon arrival of destination.

4. The method according to claim 1, wherein the tight temperature control configuration is for controlling a deviation of an actual temperature in the internal space from the setpoint temperature, the deviation being less than or equal to a first predetermined threshold.

5. The method according to claim 1, wherein the loose temperature control configuration is for controlling a deviation of an actual temperature in the internal space from the setpoint temperature, the deviation being greater than a first predetermined threshold but less than or equal to a second predetermined threshold.

6. The method according to claim 1, wherein the set of cargo measurements includes one or more of a weight of goods in the internal space, a type of goods in the internal space, a temperature measurement in the internal space, a humidity measurement in the internal space, and a vibration measurement in the internal space.

7. The method according to claim 1, wherein the shipment performance log includes one or more of temperature controlled by the TCCS, an insulation performance of the TCCS, and a certification of the goods.

8. A transport climate control system (TCCS) that provides climate control within an internal space moved by a vehicle, the TCCS comprising:
    a refrigeration circuit including a compressor, a condenser, an expansion device, and an evaporator; and
    a controller, wherein the controller is configured to:
  determine a set of TCCS operational measurements;
  obtain a set of TCCS operational settings, the set of TCCS operational settings including one or more of a tight temperature control configuration, a loose temperature control configuration, a setpoint temperature, a continuous airflow configuration, and a start-stop airflow configuration;
  determine a set of cargo measurements;
  track a freshness score to reflect a condition of goods in the internal space based on sensor data sensed by at least one sensor;
  determine the set of TCCS operational settings to achieve a freshness target based on the freshness score;
  control the TCCS with the set of TCCS operational settings;
  create a shipment performance log based on the set of TCCS operational measurements, the set of TCCS operational settings, and the set of cargo measurements;
  publish the shipment performance log to a data repository;
  retrieve the shipment performance log; and
  facilitate disposition of goods in the internal space based on the retrieved shipment performance log, disposition of goods including one or more of accepting the goods, inspecting the goods, rejecting the goods, and intervening to save the goods based on the shipment performance log,
wherein the data repository is Blockchain, publishing the shipment performance log includes disseminating, notarizing, and sharing the shipment performance log via the data repository,
wherein publishing the shipment performance log to the data repository is performed via telematics of the TCCS.

9. The TCCS according to claim 8, further comprising:
a plurality of TCCS sensors configured to obtain the set of TCCS operational measurements, the plurality of TCCS sensors communicates the set of TCCS operational measurements to the controller;
  wherein the set of TCCS operational measurements includes one or more of an ambient temperature outside of the internal space, an ambient humidity outside of the internal space, a compressor suction pressure, a compressor discharge pressure, a supply air temperature of air supplied into the internal space, a return air temperature of air returned from the internal space, and a humidity within the internal space.

10. The TCCS according claim 8, wherein the set of TCCS operational measurements includes pre-loading operational measurements, operational measurements in transit, and operational measurements upon arrival of destination.

11. The TCCS according to claim 8, wherein the tight temperature control configuration is for controlling a deviation of an actual temperature in the internal space from the setpoint temperature, the deviation being less than or equal to a first predetermined threshold.

12. The TCCS according to claim 8, wherein the loose temperature control configuration is for controlling a deviation of an actual temperature in the internal space from the setpoint temperature, the deviation being greater than a first predetermined threshold but less than or equal to a second predetermined threshold.

13. The TCCS according to claim 8, wherein the set of cargo measurements includes one or more of a weight of goods in the internal space, a type of goods in the internal space, a temperature measurement in the internal space, a humidity measurement in the internal space, and a vibration measurement in the internal space.

14. The TCCS according to claim 8, wherein the shipment performance log includes one or more of temperature controlled by the TCCS, an insulation performance of the TCCS, and a certification of the goods.

15. The TCCS according to claim 8, further comprising a set of sensors embedded in the goods, the set of sensors is configured to obtain the set of cargo measurements.

* * * * *